US007656613B2

(12) United States Patent
Sasaki et al.

(10) Patent No.: US 7,656,613 B2
(45) Date of Patent: Feb. 2, 2010

(54) MAGNETIC HEAD FOR PERPENDICULAR MAGNETIC RECORDING HAVING A SPECIALLY CONFIGURED SHIELD LAYER

(75) Inventors: Yoshitaka Sasaki, Milpitas, CA (US); Hiroyuki Itoh, Milpitas, CA (US); Dong-Hong Li, Milpitas, CA (US); Shigeki Tanemura, Milpitas, CA (US); Hironori Araki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 12/320,932

(22) Filed: Feb. 9, 2009

(65) Prior Publication Data

US 2009/0147400 A1 Jun. 11, 2009

Related U.S. Application Data

(62) Division of application No. 11/289,526, filed on Nov. 30, 2005, now Pat. No. 7,508,629.

(51) Int. Cl.
*G11B 5/127* (2006.01)

(52) U.S. Cl. .............................. 360/125.2; 360/123.12; 360/125.19

(58) Field of Classification Search ............ 360/123.19, 360/125.19–125.21
See application file for complete search history.

(56) References Cited

U.S. PATENT DOCUMENTS 4,656,546 A 4/1987 Mallory
4,807,076 A 2/1989 Nakashima et al.
6,504,675 B1 1/2003 Shukh et al.
6,801,407 B2 10/2004 Sasaki et al.
7,019,944 B2 3/2006 Matono et al.
7,248,437 B2 7/2007 Yazawa et al.
7,328,499 B2 2/2008 Matono et al.
7,428,123 B2 * 9/2008 Kameda ................ 360/125.12
2003/0151850 A1 8/2003 Nakamura et al.
2005/0141137 A1 6/2005 Okada et al.
2005/0219747 A1 10/2005 Hsu et al.

FOREIGN PATENT DOCUMENTS

JP A-2003-242607 8/2003
JP A-2003-242610 8/2003
JP A-2004-039148 2/2004
JP A-2004-348928 12/2004
JP A-2005-071429 3/2005
JP A-2005-190518 7/2005

* cited by examiner

*Primary Examiner*—A. J. Heinz
(74) *Attorney, Agent, or Firm*—Oliff & Berridge, PLC

(57) ABSTRACT

A magnetic head comprises a pole layer, a shield layer, a gap layer disposed between the pole layer and the shield layer, and a coil. The shield layer incorporates: a first layer disposed on the gap layer; a second layer disposed on the first layer; and a third layer disposed on the second layer. The first layer has an end face located in a medium facing surface. An end face of each of the second and third layers closer to the medium facing surface is located at a distance from the medium facing surface. A first nonmagnetic layer is disposed around the first layer. A second nonmagnetic layer is disposed between the medium facing surface and the end face of the second layer closer to the medium facing surface.

4 Claims, 24 Drawing Sheets

TH 18 17 21 22 23 24 20 26 20E 20D 20B 27 T 20C 25 30 20A 16 162 161 14 15 10 9 13 12 11 5 1 2 3 4 6 7 81 82 83

20E 20A2 20A1 20A3 W2 20A H1 H3 H2 20A21 20A22 30 20A32 20A31 20C 20A20 W1 20A30 20A10

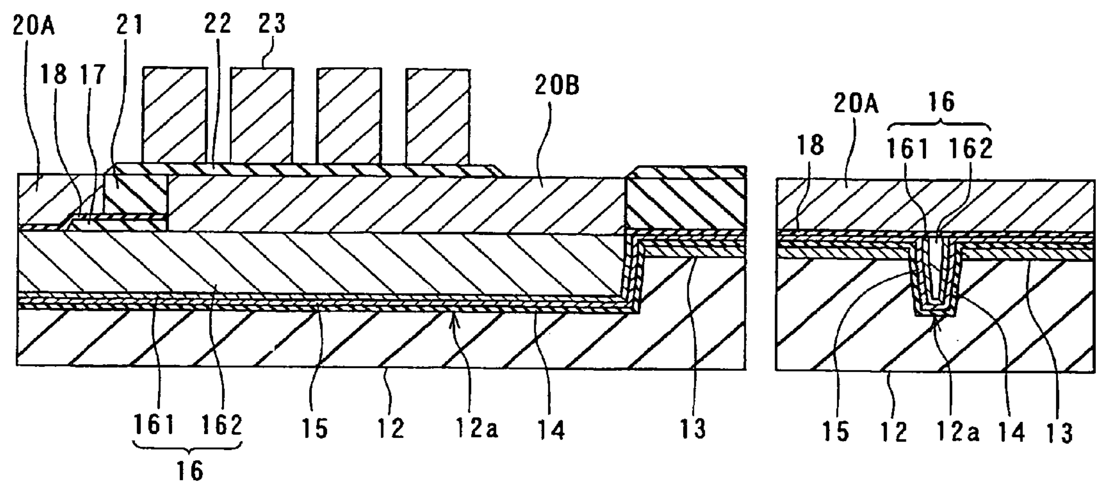
FIG. 12A
FIG. 12B
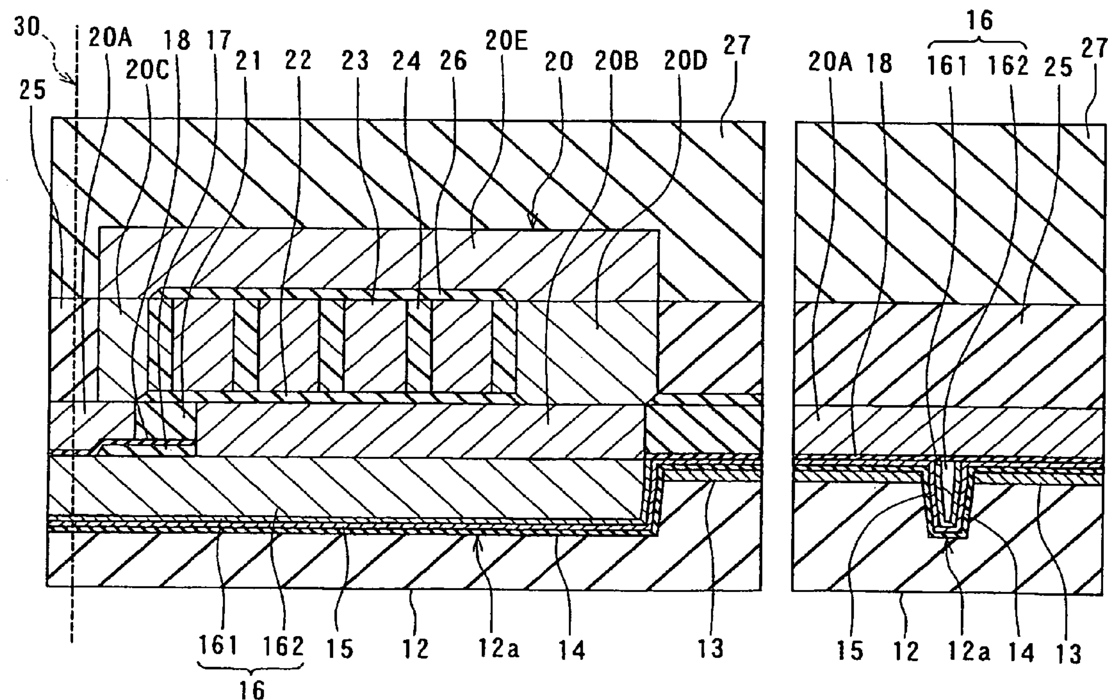
FIG. 13A
FIG. 13B

MAGNETIC HEAD FOR PERPENDICULAR MAGNETIC RECORDING HAVING A SPECIALLY CONFIGURED SHIELD LAYER

This is a Division of application Ser. No. 11/289,526 filed Nov. 30, 2005. The disclosure of the prior application is hereby incorporated by reference herein in its entirety.

BACKGROUND OF THE INVENTION

1. Field of the Invention

The present invention relates to a magnetic head for perpendicular magnetic recording that is used for writing data on a recording medium by means of a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

Like magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head comprises a pole layer that produces a magnetic field in the direction orthogonal to the surface of the recording medium.

For the perpendicular magnetic recording system, it is an improvement in recording medium and an improvement in write head that mainly contributes to an improvement in recording density. It is a reduction in track width and an improvement in write characteristics that is particularly required for the write head to achieve higher recording density. On the other hand, a reduction in track width causes degradation in the write characteristics such as an overwrite property that is a parameter indicating an overwriting capability. It is therefore required to achieve better write characteristics as the track width is reduced.

A magnetic head used for a magnetic disk drive such as a hard disk drive is typically provided in a slider. The slider has a medium facing surface that faces toward a recording medium. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, problems arise, such as a phenomenon in which data stored on an adjacent track is erased when data is written on a specific track (that is hereinafter called adjacent track erasing) or unwanted writing is performed between adjacent two tracks. To achieve higher recording density, it is required to suppress adjacent track erasing. Unwanted writing between adjacent two tracks affects detection of servo signals for alignment of the magnetic head and the signal-to-noise ratio of a read signal.

A technique is known for preventing the problems resulting from the skew as described above, as disclosed in U.S. Patent Application Publication No. US2003/0151850 A1 and U.S. Pat. No. 6,504,675 B1, for example. According to this technique, the end face of the pole layer located in the medium facing surface is made to have a shape in which the side located backward along the direction of travel of the recording medium (that is, the side located closer to the air inflow end of the slider) is shorter than the opposite side.

As a magnetic head for perpendicular magnetic recording, a magnetic head comprising the pole layer and a shield is known, as disclosed in U.S. Pat. No. 4,656,546, for example. In the medium facing surface of this magnetic head, an end face of the shield is located forward of the end face of the pole layer along the direction of travel of the recording medium with a specific small space therebetween. Such a magnetic head will be hereinafter called a shield-type head. In the shield-type head the shield prevents a magnetic flux from reaching the recording medium, the flux being generated from the end face of the pole layer and extending in directions except the direction orthogonal to the surface of the recording medium. The shield-type head achieves a further improvement in linear recording density.

Reference is now made to FIG. 32 to describe a basic configuration of the shield-type head. FIG. 32 is a cross-sectional view of the main part of an example of the shield-type head. The shield-type head comprises: a medium facing surface 100 that faces toward a recording medium; a coil 101 for generating a field corresponding to data to be written on the medium; a pole layer 102 having an end located in the medium facing surface 100, allowing a magnetic flux corresponding to the field generated by the coil 101 to pass, and generating a write magnetic field for writing the data on the medium by means of the perpendicular magnetic recording system; a shield layer 103 having an end located in the medium facing surface 100 and having a portion located away from the medium facing surface 100 and coupled to the pole layer 102; a gap layer 104 provided between the pole layer 102 and the shield layer 103; and an insulting layer 105 covering the coil 101. An insulating layer 106 is disposed around the pole layer 102. The shield layer 103 is covered with a protection layer 107.

In the medium facing surface 100, the end of the shield layer 103 is located forward of the end of the pole layer 102 along the direction T of travel of the recording medium with a specific space created by the thickness of the gap layer 104. At least part of the coil 101 is disposed between the pole layer 102 and the shield layer 103 and insulated from the pole layer 102 and the shield layer 103.

The coil 101 is made of a conductive material such as copper. The pole layer 102 and the shield layer 103 are made of a magnetic material. The gap layer 104 is made of an insulating material such as alumina ($Al_2O_3$). The insulating layer 105 is made of photoresist, for example.

In the head of FIG. 32 the gap layer 104 is disposed on the pole layer 102 and the coil 101 is disposed on the gap layer 104. The coil 101 is covered with the insulating layer 105. One of the ends of the insulating layer 105 closer to the medium facing surface 100 is located at a distance from the medium facing surface 100. In the region from the medium facing surface 100 to the end of the insulating layer 105 closer to the medium facing surface 100, the shield layer 103 faces toward the pole layer 102 with the gap layer 104 disposed in between. Throat height TH is the length (height) of the portions of the pole layer 102 and the shield layer 103 facing toward each other with the gap layer 104 disposed in between, the length being taken from the end closer to the medium facing surface 100 to the other end. The throat height TH influences the intensity and distribution of the field generated from the pole layer 102 in the medium facing surface 100.

In the shield-type head as shown in FIG. 32, for example, it is preferred to reduce the throat height TH to improve the overwrite property. It is required that the throat height TH be 0.1 to 0.3 micrometer (μm), for example. When such a small throat height TH is required, the following two problems arise in the head of FIG. 32.

The first problem of the head of FIG. 32 is that it is difficult to define the throat height TH with accuracy. The first problem will now be described in detail. In the head of FIG. 32 the throat height TH is defined by the thickness of a portion of the shield layer 103 located between the insulating layer 105 and the medium facing surface 100. In addition, the throat height TH is controlled by the depth to which the medium facing surface 100 is polished. However, the photoresist constituting the insulating layer 105 has a relatively high thermal expansion coefficient and is relatively soft. As a result, the insulating layer 105 expands due to the heat produced when polishing is performed. In addition, the portion of the shield layer 103 located between the insulating layer 105 and the medium facing surface 100 is thin, particularly when the throat height TH is small. Furthermore, the end face of the shield layer 103 is exposed in a large region in the medium facing surface. Because of these factors, particularly in the case where the throat height TH is small, when the medium facing surface 100 is polished, the insulating layer 105 expands and the end portion of the shield layer 103 located closer to the medium facing surface 100 tends to protrude. Consequently, the thickness of the portion of the shield layer 103 located between the insulating layer 105 and the medium facing surface 100 varies when the medium facing surface 100 is polished, which results in variations in throat height TH after the medium facing surface 100 is polished.

The second problem of the head of FIG. 32 is that, when the head is operated, the insulating layer 105 expands due to the heat generated by the coil 101, and the end portion of the shield layer 103 located closer to the medium facing surface 100 thereby protrudes. The protrusion of the end portion of the shield layer 103 when the head is operated induces collision of the slider with the recording medium.

OBJECT AND SUMMARY OF THE INVENTION

It is an object of the invention to provide a magnetic head for perpendicular magnetic recording having a structure in which a pole layer faces toward a shield layer with a gap layer disposed in between, the head being capable of defining the throat height with accuracy and suppressing protrusion of an end portion of the shield layer located closer to the medium facing surface resulting from the heat generated by the coil, and to provide a method of manufacturing such a magnetic head.

A first magnetic head for perpendicular magnetic recording of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium by means of a perpendicular magnetic recording system; a shield layer having an end face located in the medium facing surface and having a portion that is away from the medium facing surface and coupled to the pole layer; and a gap layer made of a nonmagnetic material and disposed between the pole layer and the shield layer.

In the medium facing surface, the end face of the shield layer is located forward of the end face of the pole layer along a direction of travel of the recording medium with a specific space created by a thickness of the gap layer. At least part of the coil is disposed between the pole layer and the shield layer and insulated from the pole layer and the shield layer. The end face of the pole layer located in the medium facing surface has a side located adjacent to the gap layer, the side defining a track width. The shield layer incorporates: a first layer located adjacent to the gap layer and having the end face located in the medium facing surface; and a second layer located on a side of the first layer farther from the gap layer. The second layer has an end face closer to the medium facing surface that is located at a distance from the medium facing surface. The first magnetic head of the invention further comprises: an insulating layer made of an insulating material and disposed around the at least part of the coil; a first nonmagnetic layer made of a nonmagnetic material and disposed around the first layer; and a second nonmagnetic layer made of a nonmagnetic material and disposed between the medium facing surface and the end face of the second layer closer to the medium facing surface.

In the first magnetic head of the invention, the end face of the second layer of the shield layer closer to the medium facing surface is not exposed in the medium facing surface. The first nonmagnetic layer is disposed around the first layer of the shield layer. The second nonmagnetic layer is disposed between the medium facing surface and the end face of the second layer closer to the medium facing surface. As a result, according to the first magnetic head of the invention, it is possible to suppress protrusion of the end portion of the shield layer located closer to the medium facing surface occurring due to expansion of the insulating layer disposed around the at least part of the coil.

In the first magnetic head of the invention, the first and second nonmagnetic layers may be made of an inorganic insulating material.

In the first magnetic head of the invention, the at least part of the coil may be located farther from the pole layer than a surface of the first layer farther from the pole layer.

In the first magnetic head of the invention, the shield layer may further incorporate a third layer connected to the second layer and disposed on a side of the at least part of the coil farther from the pole layer. In addition, the third layer may have an end face closer to the medium facing surface that is located at a distance from the medium facing surface.

In the first magnetic head of the invention, the second layer may include a portion located on a side of the at least part of the coil farther from the pole layer.

The first magnetic head of the invention may further comprise a nonmagnetic film made of a nonmagnetic material and disposed between the pole layer and the second layer. In addition, the nonmagnetic film may have an end closer to the medium facing surface that is located at a distance from the medium facing surface. In this case, the first layer may have a portion located between the nonmagnetic film and the second layer.

The first magnetic head of the invention may further comprise a substrate on which the pole layer, the gap layer, the coil and the shield layer are stacked. In addition, the pole layer may incorporate: a first portion having the end face located in the medium facing surface; and a second portion located farther from the medium facing surface than the first portion and having a thickness greater than that of the first portion, and a surface of the first portion farther from the substrate may be located closer to the substrate than a surface of the second portion farther from the substrate.

In the first magnetic head of the invention, the first layer may have two portions located at positions along the direction of width outside the end face located in the medium facing surface when seen from the medium facing surface, and an end face of each of the two portions closer to the medium facing surface may be located at a distance from the medium facing surface.

In the first magnetic head of the invention, the first layer may incorporate: a middle portion including a portion facing toward the pole layer with the gap layer disposed in between; and two side portions located at positions outside the middle portion along the direction of width, and the second layer may be connected to the side portions, not connected to the middle portion. In this case, the maximum length of each of the side portions taken in the direction orthogonal to the medium facing surface may be greater than the maximum length of the middle portion taken in the direction orthogonal to the medium facing surface.

A second magnetic head for perpendicular magnetic recording of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium by means of a perpendicular magnetic recording system; a shield layer having an end face located in the medium facing surface and having a portion that is away from the medium facing surface and coupled to the pole layer; and a gap layer made of a nonmagnetic material and disposed between the pole layer and the shield layer.

In the medium facing surface, the end face of the shield layer is located forward of the end face of the pole layer along the direction of travel of the recording medium with a specific space created by a thickness of the gap layer. At least part of the coil is disposed between the pole layer and the shield layer and insulated from the pole layer and the shield layer. The end face of the pole layer located in the medium facing surface has a side located adjacent to the gap layer, the side defining a track width. The shield layer incorporates: a first layer located adjacent to the gap layer and having the end face located in the medium facing surface; and a second layer located on a side of the first layer farther from the gap layer. The first layer has two portions located at positions along the direction of width outside the end face located in the medium facing surface when seen from the medium facing surface, and an end face of each of the two portions closer to the medium facing surface is located at a distance from the medium facing surface. The second magnetic head of the invention further comprises: an insulating layer made of an insulating material and disposed around the at least part of the coil; and a nonmagnetic layer made of a nonmagnetic material and disposed around the first layer.

In the second magnetic head of the invention, the first layer of the shield layer has the two portions located at positions along the direction of width outside the end face located in the medium facing surface when seen from the medium facing surface, and the end face of each of the two portions closer to the medium facing surface is located at a distance from the medium facing surface. In addition, the nonmagnetic layer is disposed around the first layer. As a result, according to the second magnetic head of the invention, it is possible to suppress protrusion of the end portion of the shield layer located closer to the medium facing surface occurring due to expansion of the insulating layer disposed around the at least part of the coil.

In the second magnetic head of the invention, the nonmagnetic layer may be made of an inorganic insulating material.

In the second magnetic head of the invention, the at least part of the coil may be located farther from the pole layer than a surface of the first layer farther from the pole layer.

The second magnetic head of the invention may further comprise a nonmagnetic film made of a nonmagnetic material and disposed between the pole layer and the second layer. In addition, the nonmagnetic film may have an end closer to the medium facing surface that is located at a distance from the medium facing surface. In this case, the first layer may have a portion located between the nonmagnetic film and the second layer.

A method of manufacturing the first magnetic head for perpendicular magnetic recording of the invention comprises the steps of: forming the pole layer; forming the gap layer on the pole layer; forming the first layer on the gap layer; forming the first nonmagnetic layer; forming the coil; forming the insulating layer; forming the second layer on the first layer; and forming the second nonmagnetic layer.

The magnetic head may further comprise a nonmagnetic film made of a nonmagnetic material and disposed between the pole layer and the second layer. In addition, the nonmagnetic film may have an end closer to the medium facing surface that is located at a distance from the medium facing surface, and the first layer may have a portion located between the nonmagnetic film and the second layer. In this case, the method may further comprise the step of forming the nonmagnetic film on the pole layer.

The magnetic head may further comprise a substrate on which the pole layer, the gap layer, the coil and the shield layer are stacked, and the pole layer may incorporate a first portion having the end face located in the medium facing surface, and a second portion located farther from the medium facing surface than the first portion and having a thickness greater than that of the first portion. In addition, a surface of the first portion farther from the substrate may be located closer to the substrate than a surface of the second portion farther from the substrate. In this case, the step of forming the pole layer of the method of manufacturing the first magnetic head of the invention may include the steps of: forming a magnetic layer that will be formed into the pole layer by polishing and etching later; polishing a top surface of the magnetic layer; and etching a portion of the magnetic layer such that the first and second portions are formed and the magnetic layer is thereby formed into the pole layer.

In the method of manufacturing the first magnetic head of the invention, the first layer may have two portions located at positions along a direction of width outside the end face located in the medium facing surface when seen from the medium facing surface, and an end face of each of the two portions closer to the medium facing surface may be located at a distance from the medium facing surface.

In the method of manufacturing the first magnetic head of the invention, the first layer may incorporate: a middle portion including a portion facing toward the pole layer with the gap layer disposed in between; and two side portions located at positions outside the middle portion along a direction of width. In addition, the second layer may be connected to the side portions, not connected to the middle portion. In this case, the maximum length of each of the side portions taken in the direction orthogonal to the medium facing surface may be greater than the maximum length of the middle portion taken in the direction orthogonal to the medium facing surface.

A method of manufacturing the second magnetic head for perpendicular magnetic recording of the invention comprises the steps of: forming the pole layer; forming the gap layer on the pole layer; forming the first layer on the gap layer; forming the nonmagnetic layer; forming the coil; forming the insulating layer; and forming the second layer on the first layer.

The magnetic head may further comprise a nonmagnetic film made of a nonmagnetic material and disposed between the pole layer and the second layer. In addition, the nonmagnetic film may have an end closer to the medium facing surface that is located at a distance from the medium facing surface, and the first layer may have a portion located between the nonmagnetic film and the second layer. In this case, the method of manufacturing the second magnetic head of the invention may further comprise the step of forming the nonmagnetic film on the pole layer.

According to the first magnetic head for perpendicular magnetic recording of the invention or the method of manufacturing the same, the end face of the second layer of the shield layer closer to the medium facing surface is not exposed in the medium facing surface. The first nonmagnetic layer is disposed around the first layer of the shield layer. The second nonmagnetic layer is disposed between the medium facing surface and the end face of the second layer closer to the medium facing surface. As a result, according to the invention, it is possible to suppress protrusion of the end portion of the shield layer located closer to the medium facing surface occurring due to expansion of the insulating layer disposed around at least part of the coil. Consequently, the invention makes it possible to define the throat height with accuracy and to suppress protrusion of the end portion of the shield layer located closer to the medium facing surface resulting from the heat produced by the coil.

According to the second magnetic head for perpendicular magnetic recording of the invention or the method of manufacturing the same, the first layer of the shield layer has the two portions located at positions along the direction of width outside the end face located in the medium facing surface when seen from the medium facing surface, and the end face of each of the two portions closer to the medium facing surface is located at a distance from the medium facing surface. In addition, the nonmagnetic layer is disposed around the first layer. As a result, according to the invention, it is possible to suppress protrusion of the end portion of the shield layer located closer to the medium facing surface occurring due to expansion of the insulating layer disposed around at least part of the coil. Consequently, the invention makes it possible to define the throat height with accuracy and to suppress protrusion of the end portion of the shield layer located closer to the medium facing surface resulting from the heat produced by the coil.

Other and further objects, features and advantages of the invention will appear more fully from the following description.

BRIEF DESCRIPTION OF THE DRAWINGS

FIG. 12A and FIG. 12B are views for illustrating a step that follows the step shown in FIG. 11A and FIG. 11B.

FIG. 13A and FIG. 13B are views for illustrating a step that follows the step shown in FIG. 12A and FIG. 12B.

DETAILED DESCRIPTION OF THE PREFERRED EMBODIMENTS

First Embodiment

Figure 1:
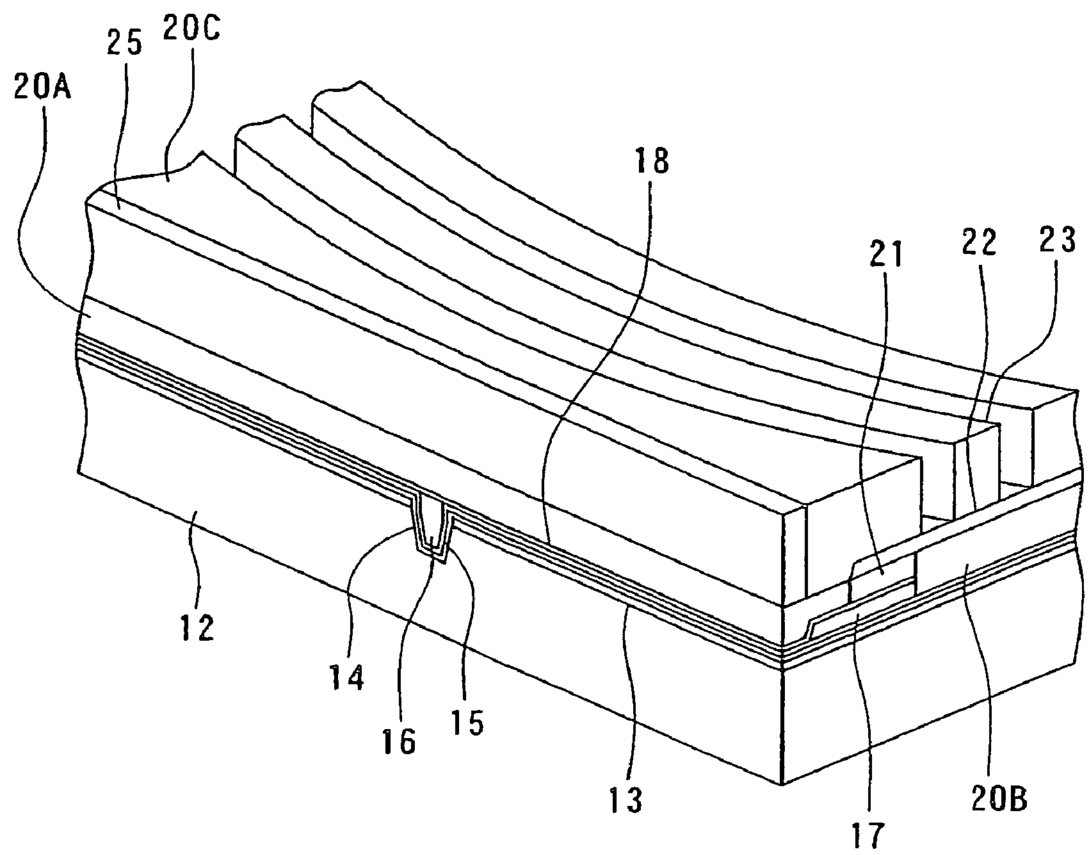
FIG. 1 is a perspective view illustrating a portion of a magnetic head of a first embodiment of the invention in a neighborhood of the medium facing surface.
Figure 2:
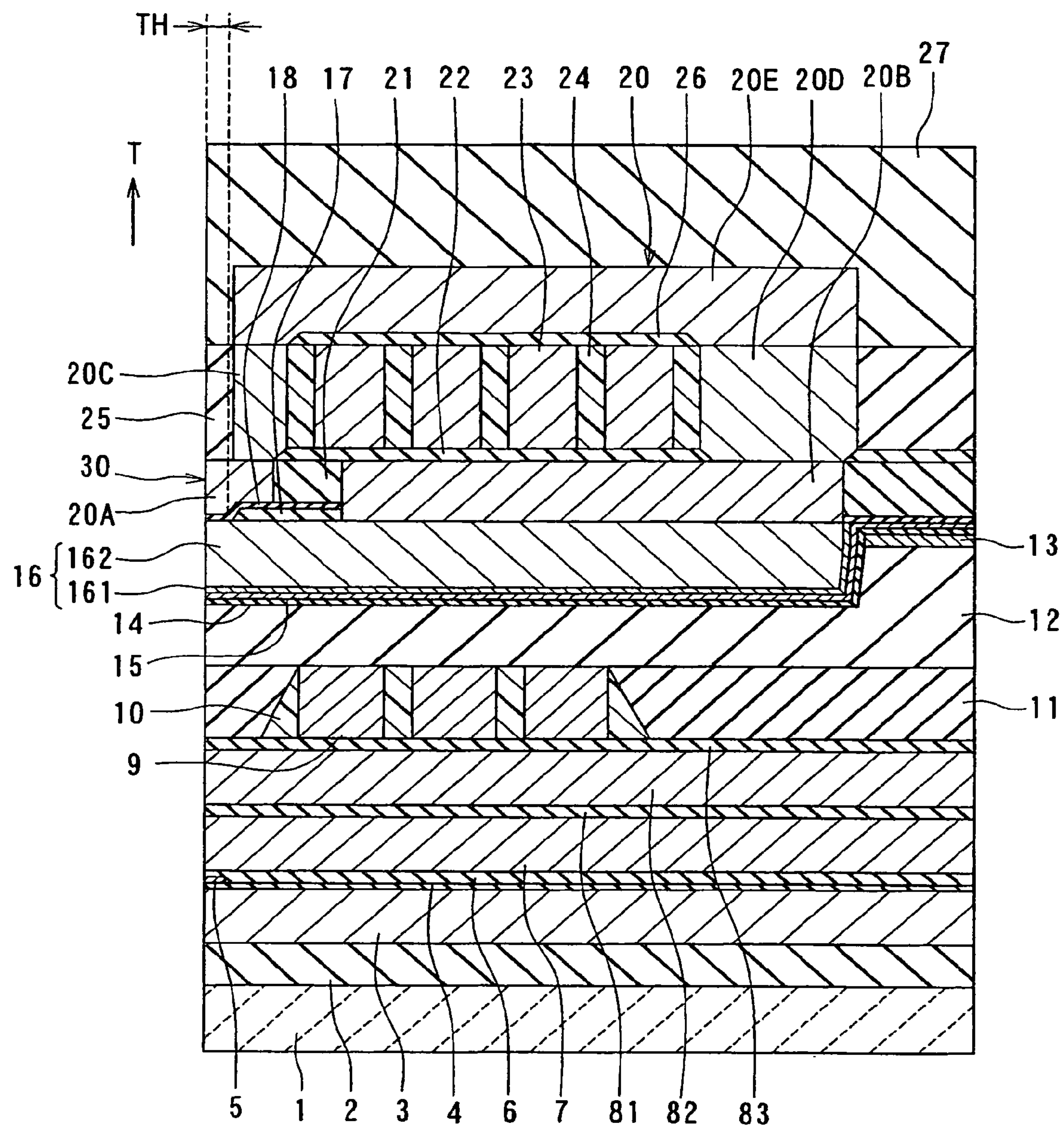
FIG. 2 is a cross-sectional view for illustrating the configuration of the magnetic head of the first embodiment of the invention.
Figure 3:
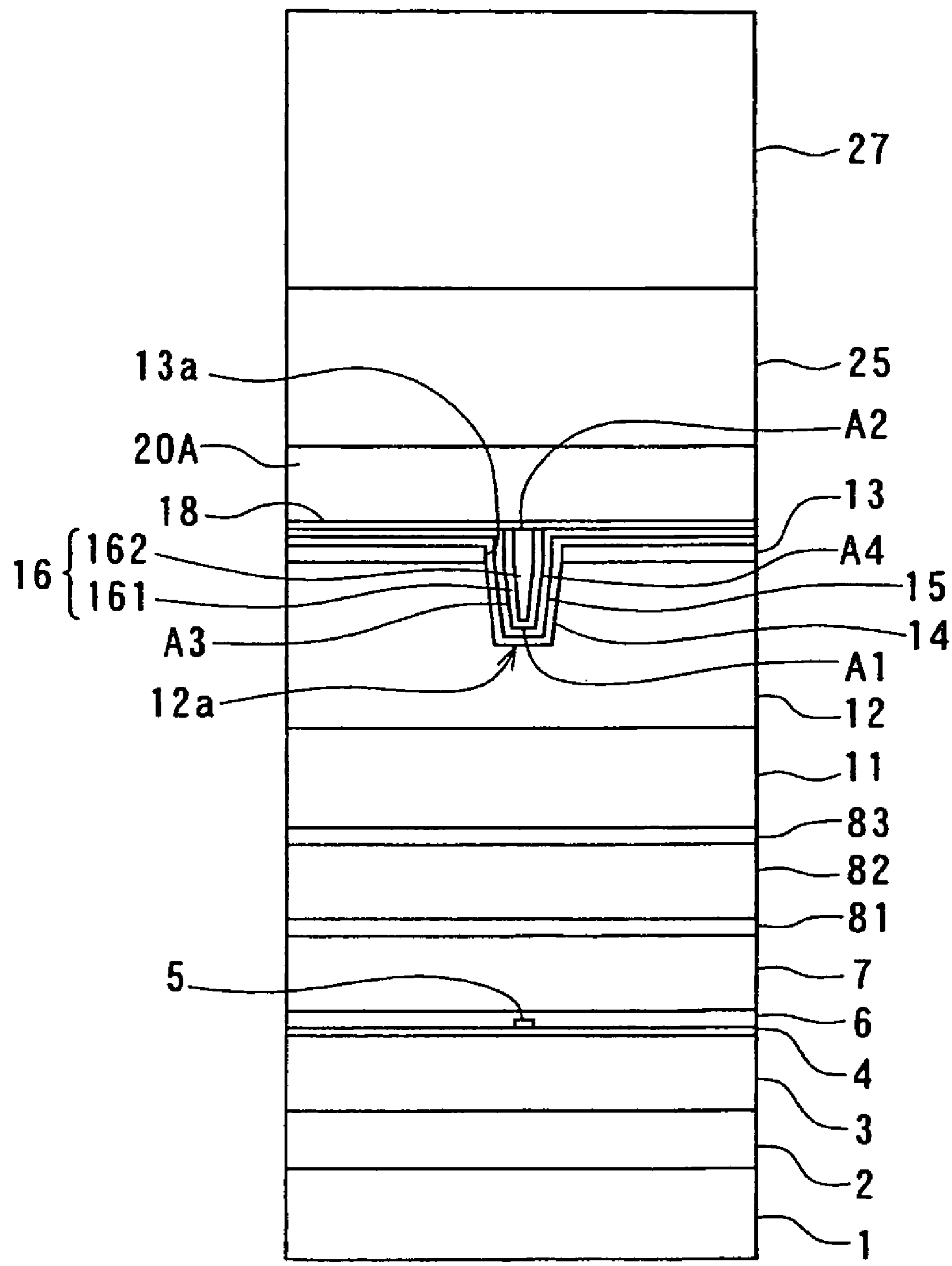
FIG. 3 is a front view of the medium facing surface of the magnetic head of the first embodiment of the invention.
Figure 4:
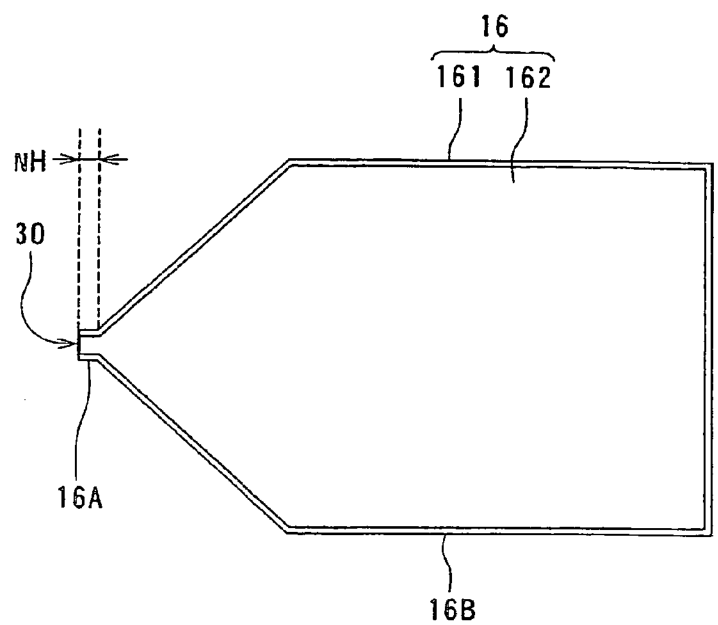
FIG. 4 is a top view of the pole layer of the magnetic head of the first embodiment of the invention.

Preferred embodiments of the invention will now be described in detail with reference to the accompanying drawings. Reference is now made to FIG. 1 to FIG. 4 to describe the configuration of a magnetic head for perpendicular magnetic recording of a first embodiment of the invention. FIG. 1 is a perspective view illustrating a portion of the magnetic head of the first embodiment in a neighborhood of the medium facing surface. FIG. 2 is a cross-sectional view for illustrating the configuration of the magnetic head of the embodiment. FIG. 2 illustrates a cross section orthogonal to the medium facing surface and a surface of a substrate. The arrow indicated with T in FIG. 2 shows the direction of travel of a recording medium. FIG. 3 is a front view of the medium facing surface of the magnetic head of the embodiment. FIG. 4 is a top view of the pole layer of the magnetic head of the embodiment.

As shown in FIG. 2 and FIG. 3, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a first top shield layer 7 made of a magnetic material and disposed on the top shield gap film 6.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The magnetic head further comprises a nonmagnetic layer 81 and a second top shield layer 82 that are disposed on the first top shield layer 7 one by one. The nonmagnetic layer 81 is made of a nonmagnetic material such as alumina. The second top shield layer 82 is made of a magnetic material. The portions from the bottom shield layer 3 to the second top shield layer 82 make up the read head.

The magnetic head further comprises: an insulating layer 83 made of an insulating material and disposed on the second top shield layer 82; a coil 9 disposed on the insulating layer 83; an insulating layer 10 made of an insulating material and disposed around the coil 9 and in the space between the respective adjacent turns of the coil 9; and an insulating layer 11 made of an insulating material and disposed around the insulating layer 10. The coil 9 is flat-whorl-shaped. The coil 9 and the insulating layers 10 and 11 have flattened top surfaces. The insulating layers 83 and 11 are made of alumina, for example. The insulating layer 10 is made of photoresist, for example. The coil 9 is made of a conductive material such as copper.

The magnetic head further comprises an encasing layer 12 made of a nonmagnetic material and disposed on the flattened top surfaces of the coil 9 and the insulating layers 10 and 11. The encasing layer 12 has a groove 12*a* that opens in the top surface thereof and that accommodates a pole layer described later. The encasing layer 12 may be made of an insulating material such as alumina, silicon oxide ($SiO_x$), or silicon oxynitride (SiON), or a nonmagnetic metal material such as Ru, Ta, Mo, Ti, W, NiCu, NiB or NiPd.

The magnetic head further comprises a nonmagnetic metal layer 13 made of a nonmagnetic metal material and disposed on the top surface of the encasing layer 12. The nonmagnetic metal layer 13 has an opening 13*a* that penetrates, and the edge of the opening 13*a* is located directly above the edge of the groove 12*a* in the top surface of the encasing layer 12. The nonmagnetic metal layer 13 may be made of any of Ta, Mo, W, Ti, Ru, Rh, Re, Pt, Pd, Ir, NiCr, NiP, NiPd, NiB, $WSi_2$, $TaSi_2$, $TiSi_2$, TiN, and TiW, for example.

The magnetic head further comprises a nonmagnetic film 14 made of a nonmagnetic material, a polishing stopper layer 15 and the pole layer 16 that are disposed in the groove 12*a* of the encasing layer 12 and in the opening 13*a* of the nonmagnetic metal layer 13. The nonmagnetic film 14 is disposed to touch the surface of the groove 12*a*. The pole layer 16 is disposed apart from the surface of the groove 12*a*. The polishing stopper layer 15 is disposed between the nonmagnetic film 14 and the pole layer 16. The polishing stopper layer 15 also functions as a seed layer used for forming the pole layer 16 by plating. The pole layer 16 incorporates: a first layer 161 located closer to the surface of the groove 12*a*; and a second layer 162 located farther from the surface of the groove 12*a*. The first layer 161 may be omitted, however.

The nonmagnetic film 14 may be made of an insulating material or a semiconductor material, for example. The insulating material as the material of the nonmagnetic film 14 may be any of alumina, silicon oxide ($SiO_x$), and silicon oxynitride (SiON). The semiconductor material as the material of the nonmagnetic film 14 may be polycrystalline silicon or amorphous silicon.

The polishing stopper layer 15 is made of a nonmagnetic conductive material. The material of the polishing stopper layer 15 may be the same as that of the nonmagnetic metal layer 13.

Each of the first layer 161 and the second layer 162 is made of a magnetic metal material. The first layer 161 may be made of any of CoFeN, CoNiFe, NiFe, and CoFe, for example. The second layer 162 may be made of any of NiFe, CoNiFe and CoFe, for example.

The magnetic head further comprises: a nonmagnetic film 17 made of a nonmagnetic material such as alumina and disposed on portions of the top surfaces of the polishing stopper layer 15 and the pole layer 16; and a gap layer 18 made of a nonmagnetic material and disposed on the polishing stopper layer 15, the pole layer 16 and the nonmagnetic film 17. The nonmagnetic film 17 has an end located closer to the medium facing surface 30 and this end is located at a distance from the medium facing surface 30. The nonmagnetic film 17 has a thickness of 0.1 to 0.3 μm, for example. The nonmagnetic film 17 and the gap layer 18 each have an opening located at a distance from the medium facing surface 30. The gap layer 18 may be made of an insulating material such as alumina or a nonmagnetic metal material such as Ru, NiCu, Ta, W, NiB or NiPd.

The magnetic head further comprises a shield layer 20. The shield layer 20 has: a first layer 20A disposed adjacent to the gap layer 18; a second layer 20C disposed on a side of the first layer 20A farther from the gap layer 18; a yoke layer 20B disposed on a portion of the pole layer 16 where the openings of the nonmagnetic film 17 and the gap layer 18 are formed; a coupling layer 20D disposed on the yoke layer 20B; and a third layer 20E disposed to couple the second layer 20C to the coupling layer 20D. The first layer 20A, the yoke layer 20B, the second layer 20C, the coupling layer 20D and the third layer 20E are each made of a magnetic material. These layers 20A to 20E may be made of any of CoFeN, CoNiFe, NiFe and CoFe, for example.

The magnetic head further comprises a nonmagnetic layer 21 made of a nonmagnetic material and disposed around the first layer 20A and the yoke layer 20B. The nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be a refractory metal such as Ta, Mo, Nb, W, Cr, Ru, or Cu.

The magnetic head further comprises: an insulating layer 22 disposed on regions of the top surfaces of the yoke layer 20B and the nonmagnetic layer 21 in which a coil 23 described later is disposed; the coil 23 disposed on the insulating layer 22; and an insulating layer 24 disposed around the coil 23 and in the space between the respective adjacent turns of the coil 23. The insulating layer 22 is made of alumina, for example. The coil 23 is flat-whorl-shaped. A portion of the coil 23 passes between the second layer 20C and the coupling layer 20D. The coil 23 is made of a conductive material such as copper. The insulating layer 24 is made of photoresist, for example.

The magnetic head further comprises: a nonmagnetic layer 25 made of a nonmagnetic material and disposed around the second layer 20C and the coupling layer 20D; and an insulating layer 26 disposed on the coil 23 and the insulating layer 24. The second layer 20C, the coupling layer 20D, the coil 23, the insulating layer 24, and the nonmagnetic layer 25 have flattened top surfaces. The nonmagnetic layer 25 and the insulating layer 26 are made of an inorganic insulating material such as alumina.

The portions from the coil 9 to the third layer 20E of the shield layer 20 make up the write head. The magnetic head further comprises a protection layer 27 made of a nonmagnetic material and formed to cover the shield layer 20. The protection layer 27 is made of an inorganic insulating material such as alumina.

As described so far, the magnetic head of the embodiment comprises the medium facing surface 30 that faces toward a recording medium, the read head, and the write head. The read head and the write head are stacked on the substrate 1. The read head is located backward along the direction T of travel of the recording medium (that is, located closer to the air inflow end of the slider). The write head is located forward along the direction T of travel of the recording medium (that is, located closer to the air outflow end of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the coil 9, the encasing layer 12, the nonmagnetic metal layer 13, the nonmagnetic film 14, the polishing stopper layer 15, the pole layer 16, the nonmagnetic film 17, the gap layer 18, the shield layer 20, the nonmagnetic layer 21, the coil 23, the insulating layer 24, and the nonmagnetic layer 25. The coils 9 and 23 generate a magnetic field corresponding to data to be written on the recording medium. The insulating layer 24 is disposed around the coil 23 and in the space between the respective adjacent turns of the coil 23. The coil 9 is not a component requisite for the write head and may be omitted. The nonmagnetic film 14 may be omitted.

The pole layer 16 has an end face located in the medium facing surface 30. The pole layer 16 allows the magnetic flux corresponding to the field generated by the coil 23 to pass therethrough and generates a write magnetic field for writing the data on the medium by using the perpendicular magnetic recording system.

The nonmagnetic film 17 is disposed on portions of the top surfaces of the polishing stopper layer 15 and the pole layer 16. The gap layer 18 is disposed on the polishing stopper layer 15, the pole layer 16 and the nonmagnetic film 17. The nonmagnetic film 17 has the end located closer to the medium facing surface 30 that is located at a distance from the medium facing surface 30.

The shield layer 20 has an end face located in the medium facing surface 30, and has a portion located away from the medium facing surface 30 and coupled to the pole layer 16.

In the medium facing surface 30, the end face of the shield layer 20 is disposed forward of the end face of the pole layer 16 along the direction T of travel of the recording medium with a specific space created by the thickness of the gap layer 18. The thickness of the gap layer 18 falls within a range of 30 to 60 nm inclusive, for example. At least part of the coil 23 is disposed between the pole layer 16 and the shield layer 20 and insulated from the pole layer 16 and the shield layer 20.

The pole layer 16 is disposed in the groove 12*a* of the encasing layer 12 and in the opening 13*a* of the nonmagnetic metal layer 13 with the nonmagnetic film 14 and the polishing stopper layer 15 disposed between the pole layer 16 and each of the groove 12*a* and the opening 13*a*. The nonmagnetic film 14 has a thickness that falls within a range of 10 to 40 nm inclusive, for example. However, the thickness of the nonmagnetic film 14 is not limited to this range but may be of any other value, depending on the track width. The polishing stopper layer 15 has a thickness that falls within a range of 30 to 100 nm inclusive, for example.

The pole layer 16 incorporates: the first layer 161 located closer to the surface of the groove 12*a*; and the second layer 162 located farther from the surface of the groove 12*a*. The first layer 161 has a thickness that falls within a range of 0 to 100 nm inclusive, for example. The first layer 161 having a thickness of 0 nm means that the first layer 161 is not provided.

The shield layer 20 has: the first layer 20A disposed adjacent to the gap layer 18 and having the end face located in the medium facing surface 30; the second layer 20C disposed on a side of the first layer 20A farther from the gap layer 18; the yoke layer 20B disposed on the portion of the pole layer 16 where the opening of the gap layer 18 is formed; the coupling layer 20D disposed on the yoke layer 20B; and the third layer 20E disposed to couple the second layer 20C to the coupling layer 20D. The coil 23 is located farther from the pole layer 16 than the surface of the first layer 20A farther from the pole layer 16. The second layer 20C is disposed between the medium facing surface 30 and the at least part of the coil 23.

The first layer 20A has a portion located between the nonmagnetic film 17 and the second layer 20C. Therefore, the bottom surface of the first layer 20A bends to face toward the top surfaces of the pole layer 16 and the nonmagnetic film 17 with the gap layer 18 disposed in between. The gap layer 18 bends along the bottom surface of the first layer 20A, too.

The nonmagnetic layer 21 is disposed around the first layer 20A. The nonmagnetic layer 21 corresponds to the first nonmagnetic layer of the invention. Each of the second layer 20C and the third layer 20E has an end face located closer to the medium facing surface 30. The end face of each of the second layer 20C and the third layer 20E is located at a distance from the medium facing surface 30. The nonmagnetic layer 25 is disposed between the medium facing surface 30 and the end face of the second layer 20C closer to the medium facing surface 30. The nonmagnetic layer 25 corresponds to the second nonmagnetic layer of the invention. It is preferred that each of the nonmagnetic layers 21 and 25 have a thermal expansion coefficient lower than that of the insulating layer 24.

In the portion of the first layer 20A facing toward the pole layer 16 with the nonmagnetic film 17 and the gap layer 18 disposed in between, the minimum distance between the end face located in the medium facing surface 30 and the opposite end face falls within a range of 0.3 to 1.2 μm inclusive, for example. In the portion of the second layer 20C facing toward the pole layer 16 with the nonmagnetic film 17, the gap layer 18 and the first layer 20A disposed in between, the minimum distance between the end face located closer to the medium facing surface 30 and the opposite end face falls within a range of 0.2 to 0.8 μm inclusive, for example. The minimum value of a length of the region where the first layer 20A touches the second layer 20C, the length being taken in the direction orthogonal to the medium facing surface 30, falls within a range of 0.1 to 0.5 μm inclusive, for example.

The first layer 20A and the yoke layer 28B have a thickness that falls within a range of 0.2 to 0.6 μm inclusive, for example. The second layer 20C and the coupling layer 20D have a thickness that falls within a range of 1.5 to 2.5 μm inclusive, for example. The third layer 20E has a thickness that falls within a range of 0.5 to 2.0 μm inclusive, for example. The coil 23 has a thickness that is equal to or smaller than the thickness of the second layer 20C and that falls within a range of 1.5 to 2.5 μm inclusive, for example.

The end face of the first layer 20A located in the medium facing surface 30 has a width equal to or greater than the track width. The maximum width of each of the second layer 20C and the third layer 20E is equal to or greater than the maximum width of the first layer 20A.

Reference is now made to FIG. 3 and FIG. 4 to describe the shape of the pole layer 16 in detail. As shown in FIG. 4, the pole layer 16 incorporates a track width defining portion 16A and a wide portion 16B. The track width defining portion 16A has an end face located in the medium facing surface 30. The wide portion 16B is located farther from the medium facing surface 30 than the track width defining portion 16A and has a width greater than the width of the track width defining portion 16A. The width of the track width defining portion 16A does not change in accordance with the distance from the medium facing surface 30. The wide portion 16B is equal in width to the track width defining portion 16A at the interface with the track width defining portion 16A, and gradually increases in width as the distance from the medium facing surface 30 increases and then maintains a specific width to the end of the wide portion 16B. In the embodiment the track width defining portion 16A is a portion of the pole layer 16 from the end face located in the medium facing surface 30 to the point at which the width of the pole layer 16 starts to increase. Here, the length of the track width defining portion 16A taken in the direction orthogonal to the medium facing surface 30 is called a neck height NH. The neck height NH falls within a range of 0.1 to 0.3 μm inclusive, for example.

As shown in FIG. 3, the end face of the pole layer 16 located in the medium facing surface 30 has: a first side A1 closest to the substrate 1; a second side A2 adjacent to the gap layer 18; a third side A3 connecting an end of the first side A1 to an end of the second side A2; and a fourth side A4 connecting the other end of the first side A1 to the other end of the second side A2. The second side A2 defines the track width. The width of the end face of the pole layer 16 located in the medium facing surface 30 decreases as the distance from the first side A1 decreases. Each of the third side A3 and the fourth side A4 forms an angle that falls within a range of 5 to 15 degrees inclusive, for example, with respect to the direction orthogonal to the top surface of the substrate 1. The length of the second side A2, that is, the track width, falls within a range of 0.05 to 0.20 μm inclusive, for example. The thickness of the pole layer 16 falls within a range of 0.15 to 0.35 μm inclusive, for example.

Throat height TH is the distance between the medium facing surface 30 and one of two points that is closer to the medium facing surface 30, wherein one of the two points is the one at which the space between the pole layer 16 and the shield layer 20 starts to increase when seen from the medium facing surface 30, and the other of the points is the one at which the gap layer 18 first bends when seen from the medium facing surface 30. In the embodiment, these two points coincide with each other, so that the throat height TH is the distance between the medium facing surface 30 and these points. The throat height TH falls within a range of 0.05 to 0.3 μm inclusive, for example.

Reference is now made to FIG. 5A to FIG. 13A and FIG. 5B to FIG. 13B to describe a method of manufacturing the magnetic head of the embodiment. FIG. 5A to FIG. 13A are cross-sectional views of layered structures obtained in manufacturing process of the magnetic head orthogonal to the medium facing surface and the substrate. FIG. 5B to FIG. 13B show cross sections of portions of the layered structures near the medium facing surface, the cross sections being parallel to the medium facing surface. The portions closer to the substrate 1 than the encasing layer 12 are omitted in FIG. 5A to FIG. 13A and FIG. 5B to FIG. 13B.

According to the method of manufacturing the magnetic head of the embodiment, as shown in FIG. 2, the insulating layer 2, the bottom shield layer 3 and the bottom shield gap film 4 are first formed one by one on the substrate 1. Next, the MR element 5 and leads (not shown) connected to the MR element 5 are formed on the bottom shield gap film 4. Next, the top shield gap film 6 is formed to cover the MR element 5 and the leads. Next, the top shield layer 7, the nonmagnetic layer 81, the second top shield layer 82, and the insulating layer 83 are formed one by one on the top shield gap film 6. Next, the coil 9 and the insulating layers 10 and 11 are formed on the insulating layer 83. Next, the top surfaces of the coil 9 and the insulating layers 10 and 11 are flattened by chemical mechanical polishing (hereinafter referred to as CMP), for example.

Figures 5A, 5B:
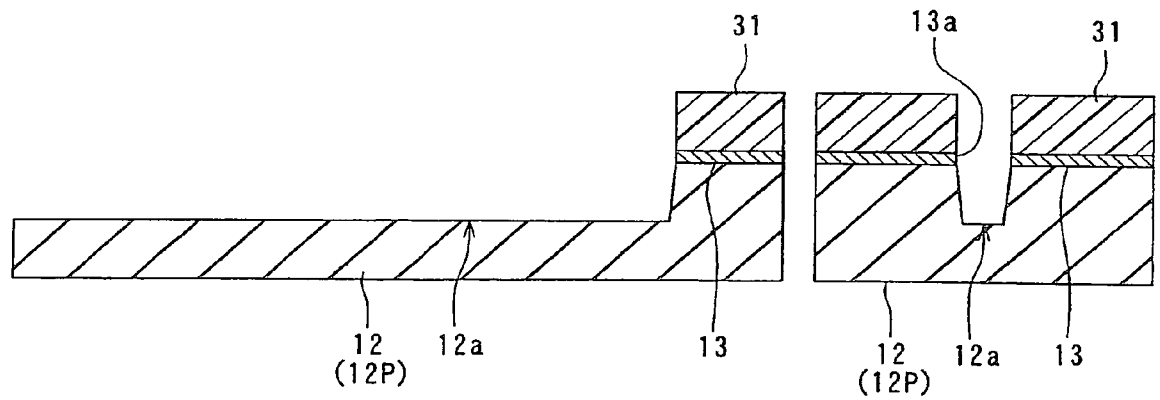
FIG. 5A and FIG. 5B are views for illustrating a step of a method of manufacturing the magnetic head of the first embodiment of the invention.

FIG. 5A and FIG. 5B illustrate the following step. In the step, first, a nonmagnetic layer 12P is formed on the flattened top surfaces of the coil 9 and the insulating layers 10 and 11. The groove 12*a* will be formed in the nonmagnetic layer 12P and the nonmagnetic layer 12P will be thereby formed into the encasing layer 12 later. Next, the nonmagnetic metal layer 13 made of a nonmagnetic metal material is formed by sputtering, for example, on the nonmagnetic layer 12P. The nonmagnetic metal layer 13 has a thickness that falls within a range of 20 to 100 nm inclusive, for example.

Next, a photoresist layer having a thickness of 1.0 μm, for example, is formed on the nonmagnetic metal layer 13. The photoresist layer is then patterned to form a mask 31 for making the groove 12*a* of the encasing layer 12. The mask 31 has an opening having a shape corresponding to the groove 12*a*.

Next, the nonmagnetic metal layer 13 is selectively etched, using the mask 31. The opening 13*a* that penetrates is thereby formed in the nonmagnetic metal layer 13. The opening 13*a* has a shape corresponding to the plane geometry of the pole layer 16 to be formed later. Furthermore, a portion of the nonmagnetic layer 12P exposed from the opening 13*a* of the nonmagnetic metal layer 13 is selectively etched so as to form the groove 12*a* in the nonmagnetic layer 12P. The mask 31 is then removed. The nonmagnetic layer 12P is formed into the encasing layer 12 by forming the groove 12*a* therein. The edge of the opening 13*a* of the nonmagnetic metal layer 13 is located directly above the edge of the groove 12*a* located in the top surface of the encasing layer 12.

The etching of each of the nonmagnetic metal layer 13 and the nonmagnetic layer 12P is performed by reactive ion etching or ion beam etching, for example. The etching for forming the groove 12*a* in the nonmagnetic layer 12P is performed such that the walls of the groove 12*a* corresponding to both sides of the track width defining portion 16A of the pole layer 16 each form an angle that falls within a range of 5 to 15 degrees inclusive, for example, with respect to the direction orthogonal to the top surface of the substrate 1.

Figure 6A:
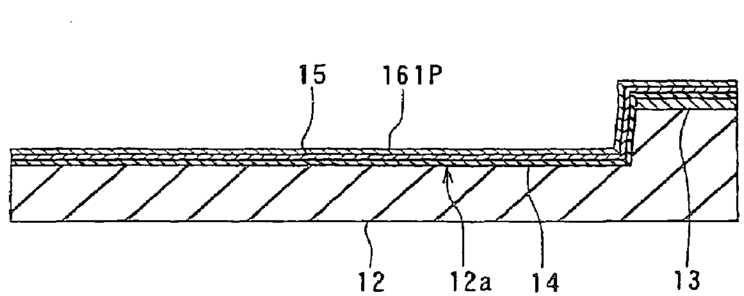
FIG. 6A and FIG. 6B are views for illustrating a step that follows the step shown in FIG. 5A and FIG. 5B.
Figure 6B:
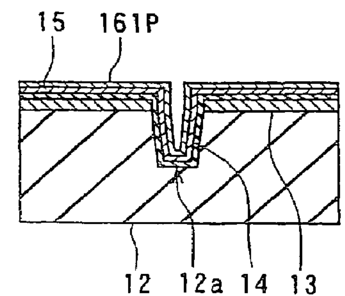

FIG. 6A and FIG. 6B illustrate the following step. In the step, first, the nonmagnetic film 14 is formed on the entire top surface of the layered structure. The nonmagnetic film 14 is formed in the groove 12*a* of the encasing layer 12, too. The nonmagnetic film 14 is formed by sputtering or chemical vapor deposition (hereinafter referred to as CVD), for example. It is possible to control the thickness of the nonmagnetic film 14 with precision. If the nonmagnetic film 14 is formed by CVD, it is preferred to employ a method called 'atomic layer CVD' (ALCVD) in which formation of a single atomic layer is repeated. In this case, it is possible to control the thickness of the nonmagnetic film 14 with higher precision. When ALCVD is employed to form the nonmagnetic film 14, it is preferable to use alumina, in particular, as the material of the nonmagnetic film 14. If the nonmagnetic film 14 is made of a semiconductor material, it is preferred to form the nonmagnetic film 14 by ALCVD at a low temperature (around 200° C.) or by low-pressure CVD at a low temperature. The semiconductor material as the material of the nonmagnetic film 14 is preferably undoped polycrystalline silicon or amorphous silicon.

Next, the polishing stopper layer 15 is formed on the entire top surface of the layered structure by sputtering or ALCVD, for example. The polishing stopper layer 15 is formed in the groove 12*a* of the encasing layer 12, too. The polishing stopper layer 15 indicates the level at which polishing of the polishing step to be performed later is stopped.

Next, a first magnetic layer 161P to be the first layer 161 of the pole layer 16 is formed on the entire top surface of the layered structure. The first magnetic layer 161P is formed by sputtering or ion beam deposition (hereinafter referred to as IBD), for example. If the first magnetic layer 161P is formed by sputtering, it is preferred to employ collimation sputtering or long throw sputtering. Since the first layer 161 may be omitted as previously described, it is not absolutely necessary to form the first magnetic layer 161P.

Figure 7A:
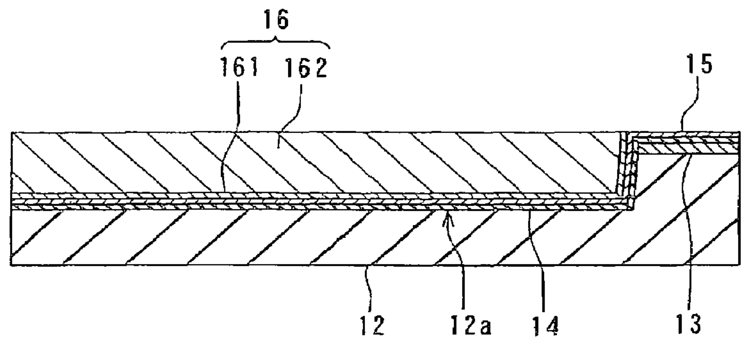
FIG. 7A and FIG. 7B are views for illustrating a step that follows the step shown in FIG. 6A and FIG. 6B.
Figure 7B:
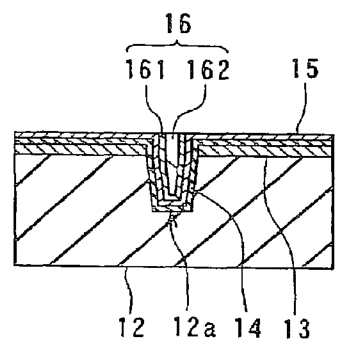

FIG. 7A and FIG. 7B illustrate the following step. In the step, first, a second magnetic layer to be the second layer 162 of the pole layer 16 is formed on the first magnetic layer 161P. The second magnetic layer is formed such that the top surface thereof is located higher than the top surfaces of the nonmagnetic metal layer 13, the nonmagnetic film 14 and the polishing stopper layer 15. The second magnetic layer is formed by frame plating, for example. In this case, the first magnetic layer 161P is used as an electrode for plating. If the polishing stopper layer 15 is made of a conductive material, the layer 15 is used as an electrode for plating, too. The second magnetic layer may be formed by making an unpatterned plating layer and then patterning the plating layer through etching.

Next, a coating layer not shown made of alumina, for example, and having a thickness of 0.5 to 1.2 μm, for example, is formed on the entire top surface of the layered structure. Next, the coating layer, the second magnetic layer and the first magnetic layer 161P are polished by CMP, for example, so that the polishing stopper layer 15 is exposed, and the top surfaces of the polishing stopper layer 15, the first magnetic layer 161P and the second magnetic layer are thereby flattened. As a result, the first magnetic layer 161P and the second magnetic layer are formed into the first layer 161 and the second layer 162, respectively. If the coating layer, the second magnetic layer and the first magnetic layer 161P are polished by CMP, such a slurry is used that polishing is stopped when the polishing stopper layer 15 is exposed, such as an alumina-base slurry.

Figure 8A:
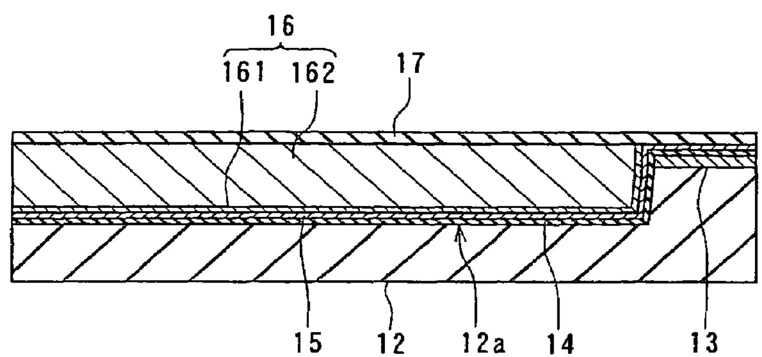
FIG. 8A and FIG. 8B are views for illustrating a step that follows the step shown in FIG. 7A and FIG. 7B.
Figure 8B:
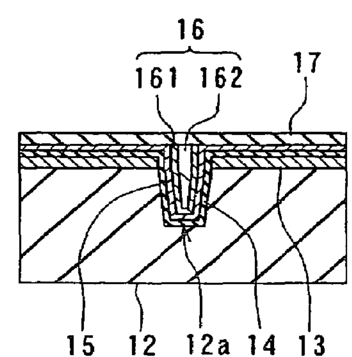

Next, as shown in FIG. 8A and FIG. 8B, the nonmagnetic film 17 is formed by sputtering, for example, on the entire top surface of the layered structure.

Figure 9A:
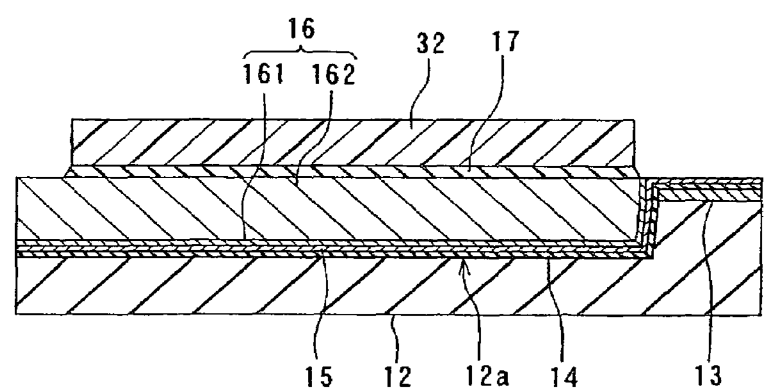
FIG. 9A and FIG. 9B are views for illustrating a step that follows the step shown in FIG. 8A and FIG. 8B.
Figure 9B:
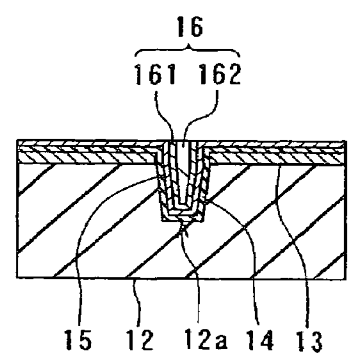

FIG. 9A and FIG. 9B illustrate the following step. In the step, first, a photoresist layer having a thickness of 1.0 μm, for example, is formed on the entire top surface of the layered structure. The photoresist layer is then patterned to form a mask 32 for etching a portion of the nonmagnetic film 17. The distance between the medium facing surface 30 and an end of the mask 32 closer to the medium facing surface 30 falls within a range of 0.1 to 0.3 μm inclusive, for example. Next, the portion of the nonmagnetic film 17 is etched by reactive ion etching, for example, using the mask 32. Next, the mask 32 is removed.

Figure 10A:
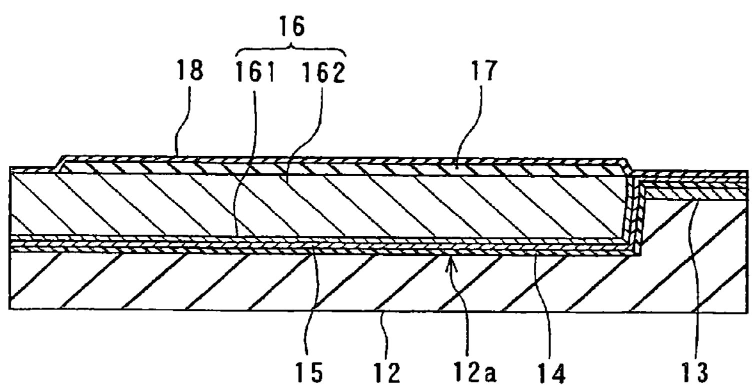
FIG. 10A and FIG. 10B are views for illustrating a step that follows the step shown in FIG. 9A and FIG. 9B.
Figure 10B:
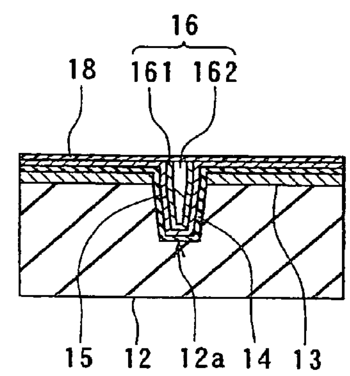

Next, as shown in FIG. 10A and FIG. 10B, the gap layer 18 is formed on the entire top surface of the layered structure. The gap layer 18 is formed by sputtering or CVD, for example. If the gap layer 18 is formed by CVD, it is preferred to employ ALCVD. If the gap layer 18 is formed by ALCVD, it is preferred that the gap layer 18 be made of alumina. The gap layer 18 formed by ALCVD exhibits a good step coverage. Therefore, it is possible to form the gap layer 18 that is uniform on the uneven surface by forming the gap layer 18 by ALCVD.

Figure 11A:
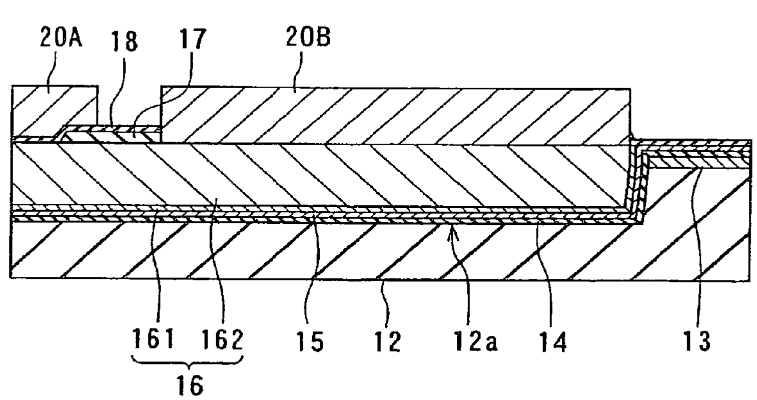
FIG. 11A and FIG. 11B are views for illustrating a step that follows the step shown in FIG. 10A and FIG. 10B.
Figure 11B:
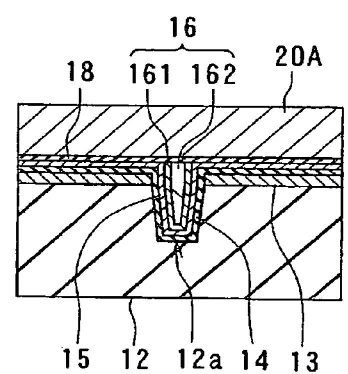

FIG. 11A and FIG. 11B illustrate the following step. In the step, first, portions of the gap layer 18 and the nonmagnetic film 17 that are away from the medium facing surface 30 are selectively etched to form openings in the gap layer 18 and the nonmagnetic film 17. Next, the first layer 20A is formed on the gap layer 18, and the yoke layer 20B is formed on a portion of the pole layer 16 where the openings of the gap layer 18 and the nonmagnetic film 17 are formed. The first layer 20A and the yoke layer 20B may be formed by frame plating or by making a magnetic layer through sputtering and then selectively etching the magnetic layer. Selective etching of the magnetic layer may be performed by, for example, making an alumina layer on the magnetic layer, making a mask on the alumina layer by frame plating, and etching the alumina layer and the magnetic layer using the mask.

FIG. 12A and FIG. 12B illustrate the following step. In the step, first, the nonmagnetic layer 21 is formed on the entire top surface of the layered structure. Next, the nonmagnetic layer 21 is polished by CMP, for example, so that the first layer 20A and the yoke layer 20B are exposed, and the top surfaces of the first layer 20A, the yoke layer 20B and the nonmagnetic layer 21 are flattened.

Next, the insulating layer 22 is formed on regions of the top surfaces of the yoke layer 20B and the nonmagnetic layer 21 in which the coil 23 will be disposed. Next, the coil 23 is formed by frame plating, for example, such that at least part of the coil 23 is disposed on the insulating layer 22.

FIG. 13A and FIG. 13B illustrate the following step. In the step, first, the second layer 20C and the coupling layer 20D are formed by frame plating, for example. Alternatively, the coil 23 may be formed after the second layer 20C and the coupling layer 20D are formed. Next, the insulating layer 24 made of photoresist, for example, is selectively formed around the coil 23 and in the space between the respective adjacent turns of the coil 23. Next, the nonmagnetic layer 25 having a thickness of 4 to 4.5 μm, for example, is formed on the entire top surface of the layered structure. Next, the nonmagnetic layer 25 is polished by CMP, for example, so that the second layer 20C, the coupling layer 20D and the coil 23 are exposed, and the top surfaces of the second layer 20C, the coupling layer 20D, the coil 23, the insulating layer 24, and the nonmagnetic layer 25 are thereby flattened. Next, the insulating layer 26 is formed on the coil 23, the insulating layer 24 and the nonmagnetic layer 25. Next, the third layer 20E is formed by frame plating, for example, to complete the shield layer 20.

Next, the protection layer 27 is formed to cover the entire top surface of the layered structure. Wiring and terminals are then formed on the protection layer 27, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head the coil 23 generates a magnetic field that corresponds to the data to be written on the medium. The pole layer 16 and the shield layer 20 form a magnetic path through which a magnetic flux corresponding to the magnetic field generated by the coil 23 passes. The pole layer 16 allows the flux corresponding to the field generated by the coil 23 to pass and generates a write magnetic field used for writing the data on the medium through the use of the perpendicular magnetic recording system. The shield layer 20 takes in a disturbance magnetic field applied from outside the magnetic head to the magnetic head. It is thereby possible to prevent erroneous writing on the recording medium caused by the disturbance magnetic field intensively taken in into the pole layer 16.

According to the embodiment, in the medium facing surface 30, the end face of the shield layer 20 is located forward of the end face of the pole layer 16 along the direction T of travel of the recording medium (that is, located closer to the air outflow end of the slider) with a specific small space created by the gap layer 18. The location of an end of the bit pattern written on the recording medium is determined by the location of the end of the pole layer 16 that is closer to the gap layer 18 and located in the medium facing surface 30. The shield layer 20 takes in a magnetic flux generated from the end face of the pole layer 16 located in the medium facing surface 30 and extending in directions except the direction orthogonal to the surface of the recording medium so as to prevent the flux from reaching the recording medium. It is thereby possible to prevent a direction of magnetization of the bit pattern already written on the medium from being changed due to the effect of the above-mentioned flux. According to the embodiment, an improvement in linear recording density is thus achieved.

Figure 32:
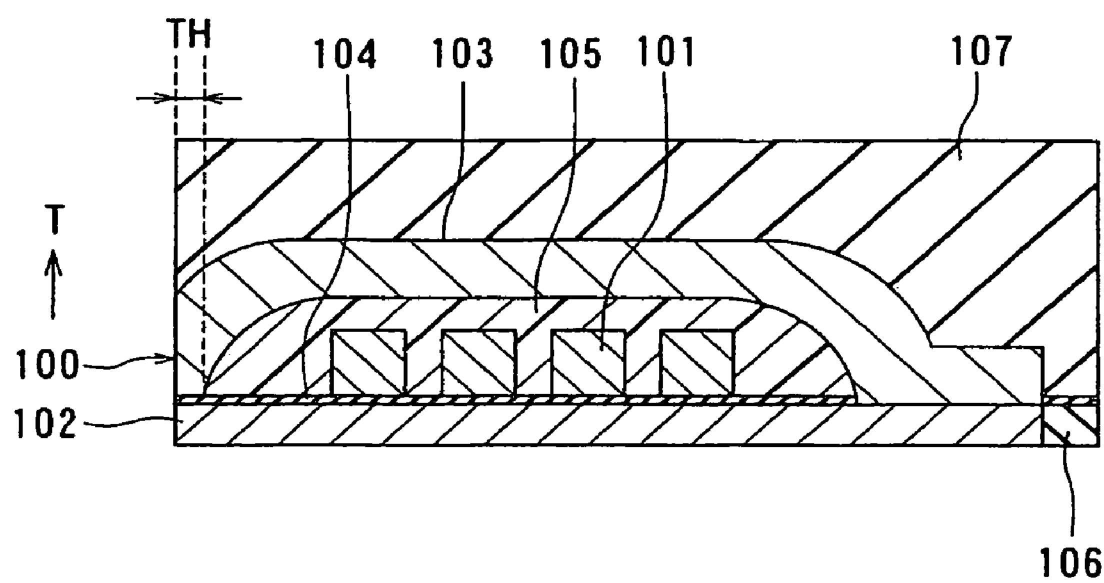
FIG. 32 is a cross-sectional view illustrating a main part of an example of the shield-type head.

According to the embodiment, the nonmagnetic layer 21 is disposed around the first layer 20A of the shield layer 20. In addition, the end face of the second layer 20C of the shield layer 20 located closer to the medium facing surface 30 is not exposed in the medium facing surface 30, and the nonmagnetic layer 25 is disposed between the medium facing surface 30 and the end face of the second layer 20C located closer to the medium facing surface 30. As a result, according to the embodiment, it is possible to make the area of the end face of the shield layer 20 exposed in the medium facing surface 30 smaller and to make the distance between the medium facing surface 30 and the insulating layer 24 disposed around the coil 23 greater, compared with the magnetic head of FIG. 32. It is thereby possible to suppress protrusion of the end portion of the shield layer 20 located closer to the medium facing surface 30 occurring in response to expansion of the insulating layer 24 disposed around the coil 23. As a result, it is possible to define the throat height TH with accuracy and to suppress protrusion of the end portion of the shield layer 20 located closer to the medium facing surface 30 resulting from the heat generated by the coil 23. This effect is particularly noticeable if the nonmagnetic layers 21 and 25 are made of an inorganic insulating material that is harder than the material of the insulating layer 24 (such as photoresist) or if the nonmagnetic layers 21 and 25 have a thermal expansion coefficient smaller than that of the insulating layer 24. To make the most of the effect, it is preferred that the coil 23 be located farther from the pole layer 16 than the surface of the first layer 20A farther from the pole layer 16.

According to the embodiment, the throat height TH is not defined by the end of the first layer 20A farther from the medium facing surface 30 but defined by the point at which the gap layer 18 first bends when seen from the medium facing surface 30, that is, the point at which the bottom surface of the first layer 20A first bends when seen from the medium facing surface 30. As a result, it is possible to reduce the throat height TH while the volume of the first layer 20A is sufficiently increased. It is thereby possible to further suppress protrusion of the end portion of the shield layer 20 located closer to the medium facing surface 30 and to improve the overwrite property.

According to the embodiment, as shown in FIG. 2, the end face of the pole layer 16 located in the medium facing surface 30 has a width that decreases as the distance from the first side A1 decreases. It is thereby possible to prevent the problems resulting from the skew.

According to the embodiment, the pole layer 16 is disposed in the groove 12*a* of the encasing layer 12 made of a nonmagnetic material with the nonmagnetic film 14 and the polishing stopper layer 15 disposed between the pole layer 16 and the groove 12*a*. Consequently, the pole layer 16 is smaller than the groove 12*a* in width. It is thereby possible to easily form the groove 12*a* and to easily reduce the width of the pole layer 16 and the width of the top surface of the track width defining portion 16A that defines the track width, in particular. As a result, according to the embodiment, it is possible to easily implement the track width that is smaller than the minimum track width that can be formed by photolithography and to control the track width with accuracy.

Modification Examples

Figure 14A:
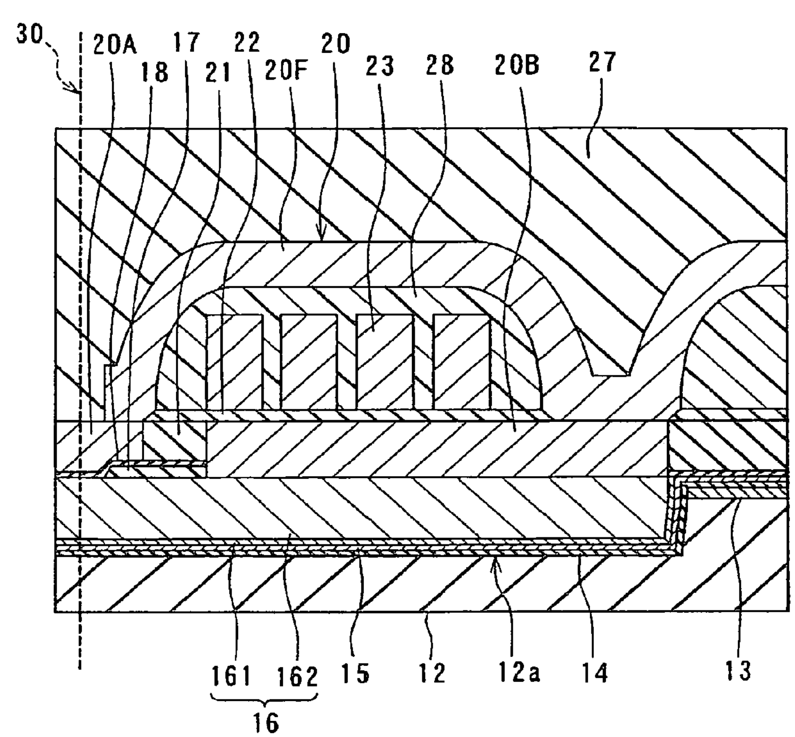
FIG. 14A and FIG. 14B are views for illustrating a first modification example of the magnetic head of the first embodiment of the invention.
Figure 14B:
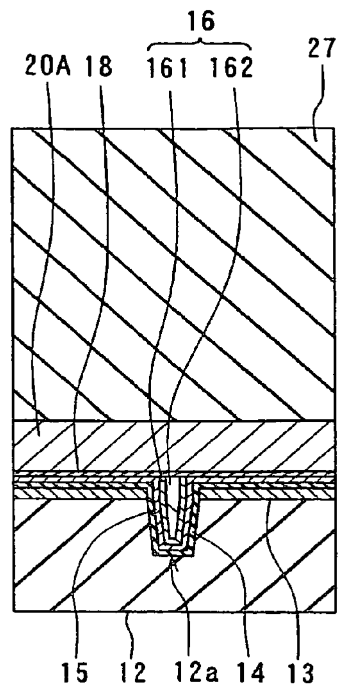

First to third modification examples of the embodiment will now be described. FIG. 14A and FIG. 14B illustrate the first modification example. FIG. 14A shows a cross section of the main part of the magnetic head orthogonal to the medium facing surface and the substrate. FIG. 14B shows a cross section of the main part of the magnetic head near the medium facing surface that is parallel to the medium facing surface. In FIG. 14A and FIG. 14B the portions closer to the substrate 1 than the encasing layer 12 are omitted.

The magnetic head of the first modification example comprises an insulating layer 28 that covers at least part of the coil 23 in place of the insulating layer 24 of FIG. 2. The insulating layer 28 is made of photoresist, for example. The shield layer 20 of the first modification example comprises a second layer 20F in place of the second layer 20C, the coupling layer 20D and the third layer 20E of the FIG. 2. One of end faces of the second layer 20F closer to the medium facing surface 30 is located at a distance from the medium facing surface 30. The second layer 20F is disposed to couple the first layer 20A to the yoke layer 20B. The second layer 20F includes a portion located on a side of the at least part of the coil 23 covered with the insulating layer 28, the side being opposite to the pole layer 16. The second layer 20F may be made of any of CoFeN, CoNiFe, NiFe, and CoFe, for example. In the first modification example, the protection layer 27 is disposed between the medium facing surface 30 and the end face of the second layer 20F closer to the medium facing surface 30. The protection layer 27 of the first modification example corresponds to the second nonmagnetic layer of the invention. It is preferred that the protection layer 27 has a thermal expansion coefficient smaller than that of the insulating layer 28. The remainder of configuration, function and effects of the magnetic head of the first modification example are similar to those of the magnetic head of FIG. 1 to FIG. 4.

Figures 15A, 15B:
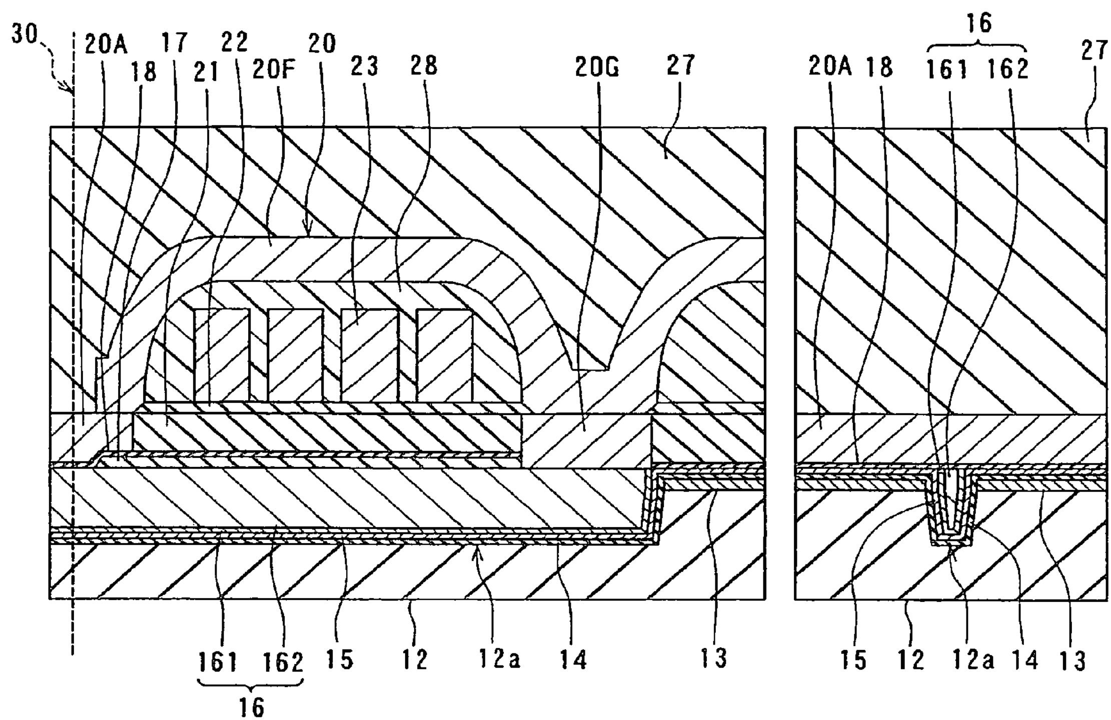
FIG. 15A and FIG. 15B are views for illustrating a second modification example of the magnetic head of the first embodiment of the invention.

FIG. 15A and FIG. 15B illustrate the second modification example. FIG. 15A shows a cross section of the main part of the magnetic head orthogonal to the medium facing surface and the substrate. FIG. 15B shows a cross section of the main part of the magnetic head near the medium facing surface that is parallel to the medium facing surface. In FIG. 15A and FIG. 15B the portions closer to the substrate 1 than the encasing layer 12 are omitted.

In the second modification example a coupling layer 20G is provided in place of the yoke layer 20B of the first modification example. The coupling layer 20G is made of a material the same as that of the yoke layer 20B. The bottom surface of the coupling layer 20G touches the top surface of the pole layer 16. The top surface of the coupling layer 20G touches the bottom surface of the second layer 20F. The coupling layer 20G is disposed only in a region corresponding to the center of the coil 23. The nonmagnetic film 17, the gap layer 18 and the nonmagnetic layer 21 further extend to a region below at least part of the coil 23. The remainder of configuration, function and effects of the magnetic head of the second modification example are similar to those of the magnetic head of the first modification example.

Figure 16A:
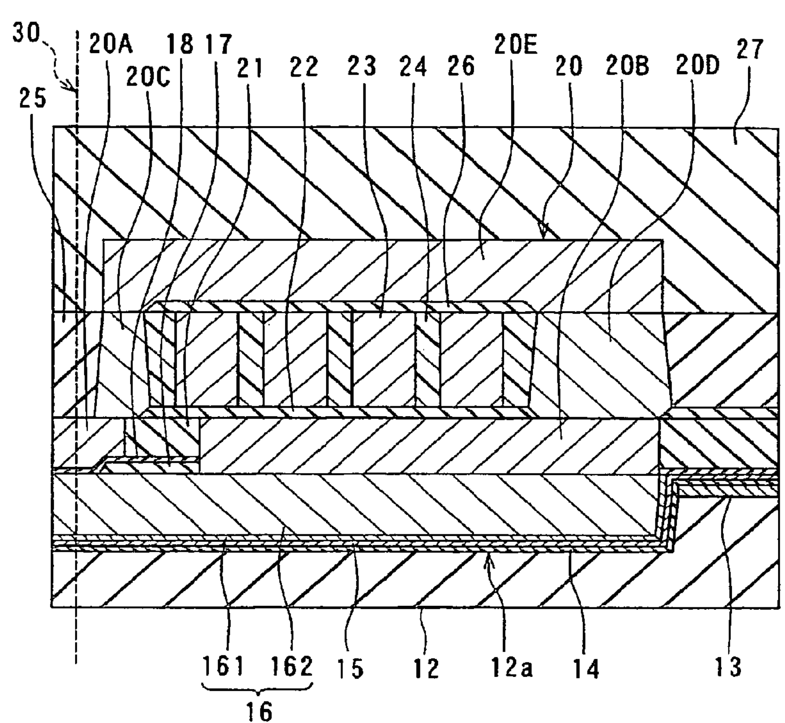
FIG. 16A and FIG. 16B are views for illustrating a third modification example of the magnetic head of the first embodiment of the invention.
Figure 16B:
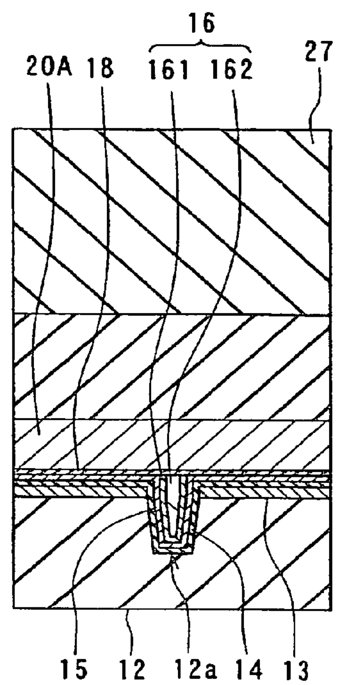

FIG. 16A and FIG. 16B illustrate the third modification example. FIG. 16A shows a cross section of the main part of the magnetic head orthogonal to the medium facing surface and the substrate. FIG. 16B shows a cross section of the main part of the magnetic head near the medium facing surface that is parallel to the medium facing surface. In FIG. 16A and FIG. 16B the portions closer to the substrate 1 than the encasing layer 12 are omitted.

In the third modification example each of the second layer 20C and the coupling layer 20D has a width that decreases as the distance from the substrate 1 increases. Consequently, the distance between the medium facing surface 30 and the end face of the second layer 20C closer to the medium facing surface 30 increases as the distance from the substrate 1 increases. The remainder of configuration, function and effects of the magnetic head of the third modification example are similar to those of the magnetic head of FIG. 1 to FIG. 4.

Second Embodiment

Figure 17:
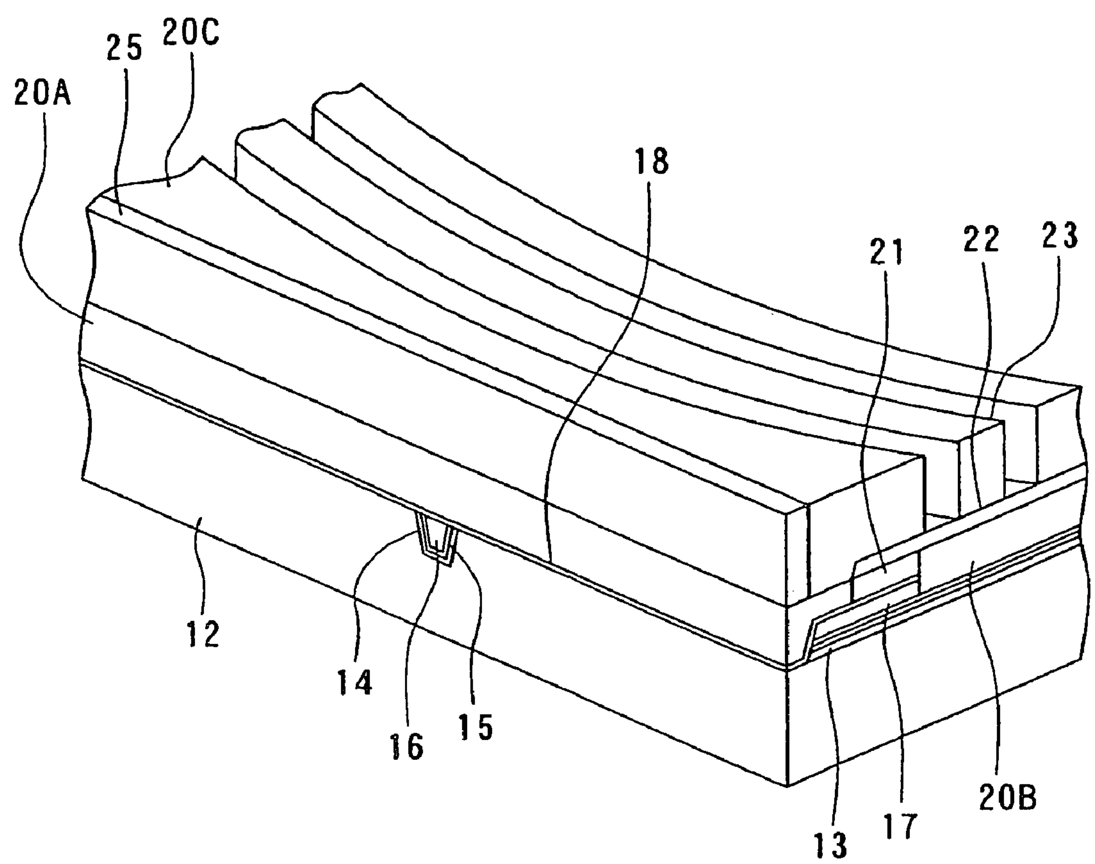
FIG. 17 is a perspective view illustrating a portion of a magnetic head of a second embodiment of the invention in a neighborhood of the medium facing surface.
Figure 18:
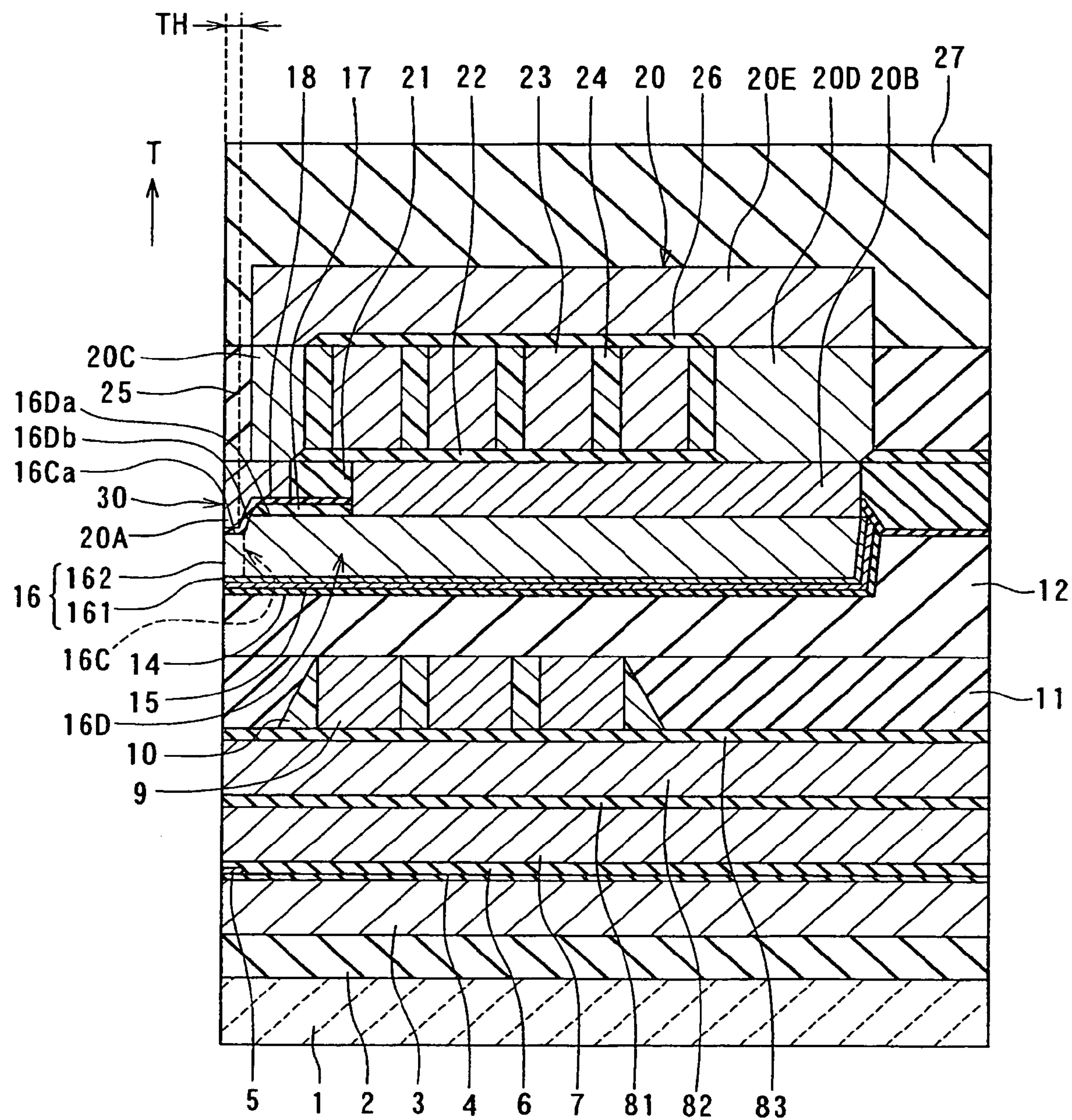
FIG. 18 is a cross-sectional view for illustrating the configuration of the magnetic head of the second embodiment of the invention.
Figure 19:
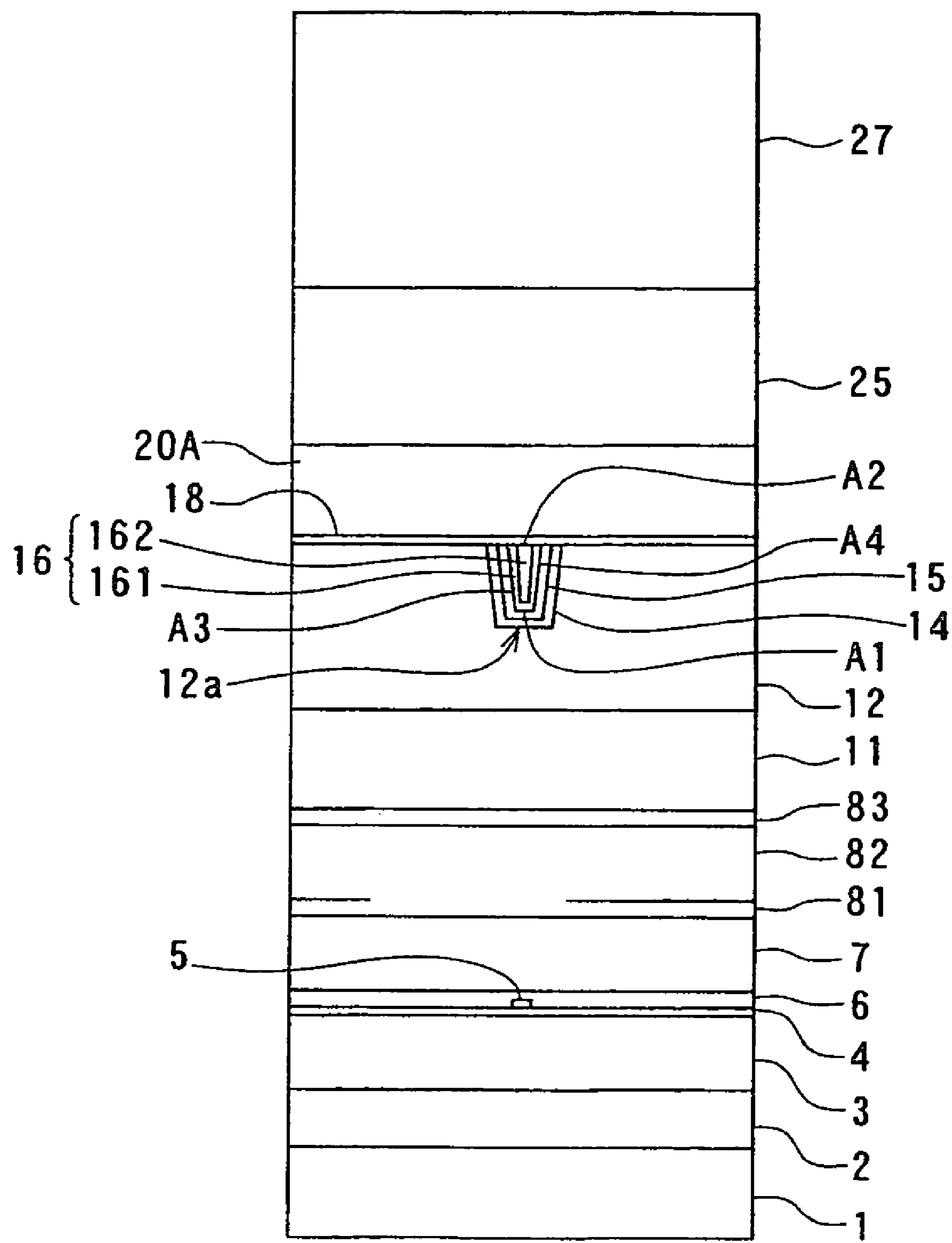
FIG. 19 is a front view of the medium facing surface of the magnetic head of the second embodiment of the invention.

A magnetic head and a method of manufacturing the same of a second embodiment of the invention will now be described. Reference is now made to FIG. 17 to FIG. 19 to describe the configuration of the magnetic head of the second embodiment. FIG. 17 is a perspective view illustrating a portion of the magnetic head of the embodiment in a neighborhood of the medium facing surface. FIG. 18 is a cross-sectional view for illustrating the configuration of the magnetic head of the embodiment. FIG. 18 illustrates a cross section orthogonal to the medium facing surface and a surface of a substrate. The arrow indicated with T in FIG. 18 shows the direction of travel of a recording medium. FIG. 19 is a front view of the medium facing surface of the magnetic head of the embodiment.

In the second embodiment, as shown in FIG. 18, the pole layer 16 incorporates: a first portion 16C having the end face located in the medium facing surface 30; and a second portion 16D located farther from the medium facing surface 30 than the first portion 16C and having a thickness greater than that of the first portion 16C. The thickness of the first portion 16C does not change in accordance with the distance from the medium facing surface 30.

The location of the boundary between the first portion 16C and the second portion 16D may coincide with the location of the boundary between the track width defining portion 16A and the wide portion 16B, or may be located closer to or farther from the medium facing surface 30 than the boundary between the track width defining portion 16A and the wide portion 16B. The distance from the medium facing surface 30 to the boundary between the first portion 16C and the second portion 16D falls within a range of 0.1 to 0.5 μm inclusive, for example. An example in which the location of the boundary between the first portion 16C and the second portion 16D coincides with the location of the boundary between the track width defining portion 16A and the wide portion 16B will now be described.

A surface (a top surface) 16Ca of the first portion 16C farther from the substrate 1 is located closer to the substrate 1 than a surface (a top surface) 16Da of the second portion 16D farther from the substrate 1. The second portion 16D has a front end face 16Db that couples the surface 16Ca of the first portion 16C farther from the substrate 1 to the surface 16Da of the second portion 16D farther from the substrate 1. The front end face 16Db may be nearly orthogonal to the top surface of the substrate 1. Here, the front end face 16Db nearly orthogonal to the top surface of the substrate 1 means that the front end face 16Db forms an angle that falls within a range of 80 to 90 degrees inclusive with respect to the top surface of the substrate 1. If the front end face 16Db forms an angle that is equal to or greater than 80 degrees and smaller than 90 degrees with respect to the top surface of the substrate 1, each of the angle formed between the surfaces 16Ca and 16Db and the angle formed between the surfaces 16Da and 16Db is an obtuse angle. Alternatively, the front end face 16Db may be tilted with respect to the direction orthogonal to the top surface of the substrate 1 such that, in the region in which the front end face 16Db is located, the thickness of the pole layer 16 gradually increases as the distance from the medium facing surface 30 increases. In this case, the front end face 16Db preferably forms an angle that is equal to or greater than 30 degrees and smaller than 80 degrees with respect to the top surface of the substrate 1. The difference in level created between the surface 16Ca and the surface 16Da falls within a range of 0.1 to 0.3 μm inclusive, for example.

An end of the nonmagnetic film 17 closer to the medium facing surface 30 is located at a position corresponding to a corner portion formed between the surfaces 16Da and 16Db.

The shield layer 20 has a portion that is sandwiched between the front end face 16Db and the medium facing surface 30 and that is located in a region closer to the substrate 1 than the surface 16Da of the second portion 16D farther from the substrate 1. To be specific, this portion is a portion of the first layer 20A of the shield layer 20 closer to the substrate 1 than the surface 16Da. An end of the yoke layer 20B of the shield layer 20 located closer to the medium facing surface 30 is located farther from the medium facing surface 30 than the boundary between the surfaces 16Da and 16Db of the pole layer 16.

In the embodiment, the throat height TH is the distance between the medium facing surface 30 and the point at which the gap layer 18 first bends when seen from the medium facing surface 30, that is, the distance between the medium facing surface 30 and the point at which the bottom surface of the first layer 20A first bends when seen from the medium facing surface 30. The reason will now be described. In the region from the medium facing surface 30 to the point at which the gap layer 18 first bends when seen from the medium facing surface 30, the flux leakage between the pole layer 16 and the shield layer 20 is greater, compared with the flux leakage between the pole layer 16 and the shield layer 20 in any other region. Furthermore, it is the flux leakage between the pole layer 16 and the shield layer 20 in the region from the medium facing surface 30 to the point at which the gap layer 18 first bends when seen from the medium facing surface 30 that contributes to writing of data. Therefore, it is appropriate that the throat height TH is defined as the distance from the medium facing surface 30 to the point at which the gap layer 18 first bends when seen from the medium facing surface 30.

Reference is now made to FIG. 20A to FIG. 25A and FIG. 20B to FIG. 25B to describe a method of manufacturing the magnetic head of the embodiment. FIG. 20A to FIG. 25A are cross-sectional views of layered structures obtained in manufacturing process of the magnetic head orthogonal to the medium facing surface and the substrate. FIG. 20B to FIG. 25B show cross sections of portions of the layered structures near the medium facing surface, the cross sections being parallel to the medium facing surface. The portions closer to the substrate 1 than the encasing layer 12 are omitted in FIG. 20A to FIG. 25A and FIG. 20B to FIG. 25B.

Figure 20A:
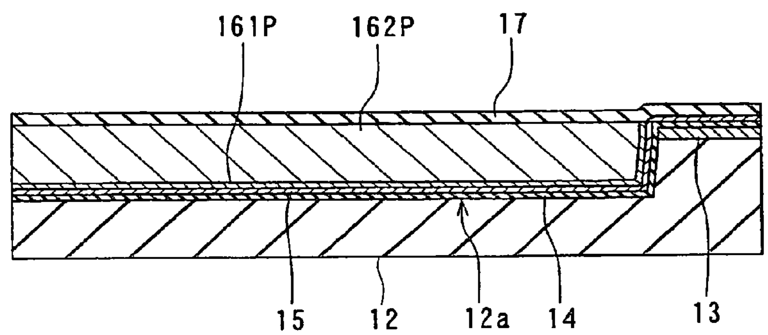
FIG. 20A and FIG. 20B are views for illustrating a step of a method of manufacturing the magnetic head of the second embodiment of the invention.
Figure 20B:
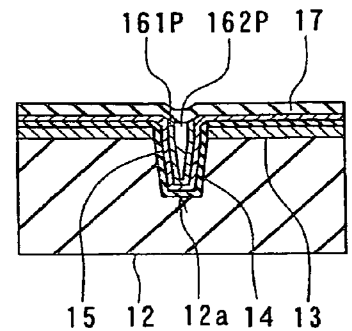

The method of manufacturing the magnetic head of the second embodiment includes the steps up to the step shown in FIG. 7A and FIG. 7B that are the same as those of the first embodiment. That is, the second magnetic layer 162P to be the second layer 162 of the pole layer 16 is formed on the first magnetic layer 161P and then the coating layer, the second magnetic layer 162P and the first magnetic layer 161P are polished until the polishing stopper layer 15 is exposed. In the following step of the second embodiment, as shown in FIG. 20A and FIG. 20B, the nonmagnetic film 17 is formed by sputtering, for example, on the entire top surface of the layered structure.

Figure 21A:
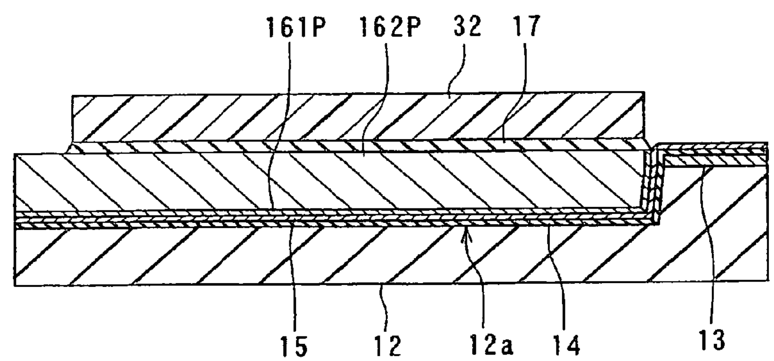
FIG. 21A and FIG. 21B are views for illustrating a step that follows the step shown in FIG. 20A and FIG. 20B.
Figure 21B:
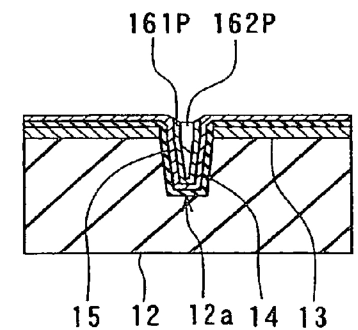

FIG. 21A and FIG. 21B illustrate the following step. In the step, first, a photoresist layer having a thickness of 1.0 μm, for example, is formed on the entire top surface of the layered structure. The photoresist layer is then patterned to form a mask 32 for etching portions of the magnetic layers 161P and 162P and the nonmagnetic film 17. The distance between the medium facing surface 30 and an end of the mask 32 closer to the medium facing surface 30 falls within a range of 0.1 to 0.3 μm inclusive, for example. The mask 32 is located above the top surfaces of the magnetic layers 161P and 162P except the regions in which the surface 16Ca and the front end face 16Db will be formed. Next, a portion of the nonmagnetic film 17 is etched by reactive ion etching, for example, using the mask 32.

Figure 22A:
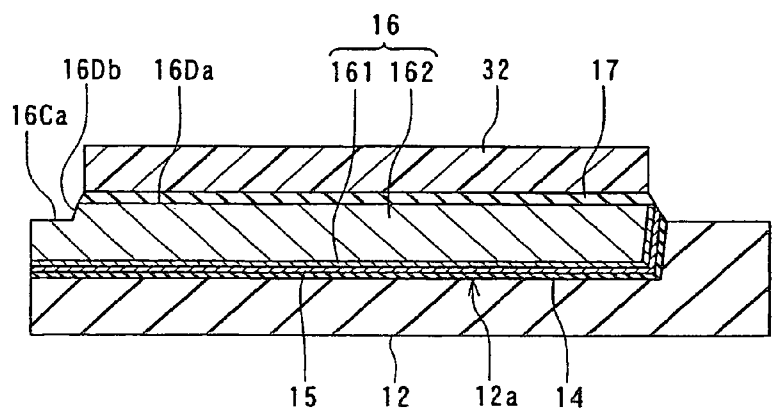
FIG. 22A and FIG. 22B are views for illustrating a step that follows the step shown in FIG. 21A and FIG. 21B.
Figure 22B:
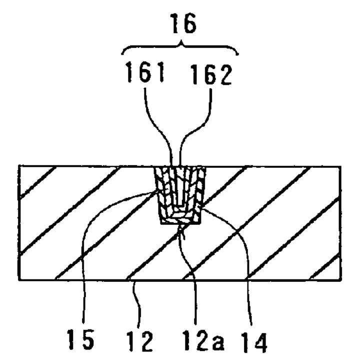

Next, as shown in FIG. 22A and FIG. 22B, the portions of the magnetic layers 161P and 162P are etched by ion beam etching, for example, using the mask 32. As a result, the surfaces 16Ca and 16Da and the front end face 16Db are formed on the top surfaces of the magnetic layers 161P and 162P, and the magnetic layers 161P and 162P are thereby formed into the first layer 161 and the second layer 162, respectively. When the portions of the magnetic layers 161P and 162P are etched by ion beam etching, the direction in which ion beams move should form an angle that falls within a range of 40 to 55 degrees inclusive, for example, with respect to the top surface of the substrate 1. It is thereby possible that the front end face 16Db form an angle that falls within a range of 80 to 90 degrees inclusive with respect to the top surface of the substrate 1. In addition, this etching is performed such that the second side A2 of the end face of the pole layer 16 located in the medium facing surface 30 is disposed at a height that falls within the range between the height at which the top surface of the nonmagnetic metal layer 13 as initially formed is located and the height at which the bottom surface thereof is located. Therefore, the nonmagnetic metal layer 13 serves as the reference that indicates the level at which this etching is stopped. The portions of the magnetic layers 161P and 162P are etched in the manner thus described, so that each of the track width and the thickness of the pole layer 16 taken in the medium facing surface 30 is controlled to be nearly uniform. It is thereby possible to control the thickness of the pole layer 16 and the track width with precision. Next, the mask 32 is removed.

Figure 23A:
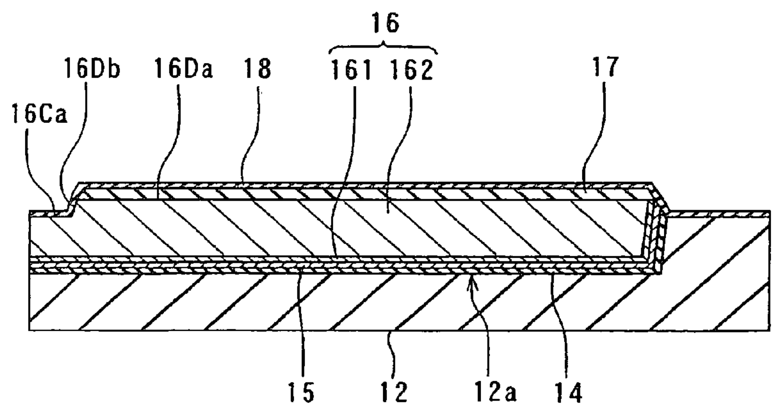
FIG. 23A and FIG. 23B are views for illustrating a step that follows the step shown in FIG. 22A and FIG. 22B.
Figure 23B:
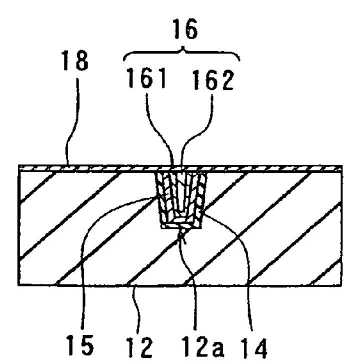

Next, as shown in FIG. 23A and FIG. 23B, the gap layer 18 is formed on the entire top surface of the layered structure. The material and the formation method of the gap layer 18 are the same as those of the first embodiment.

Figure 24A:
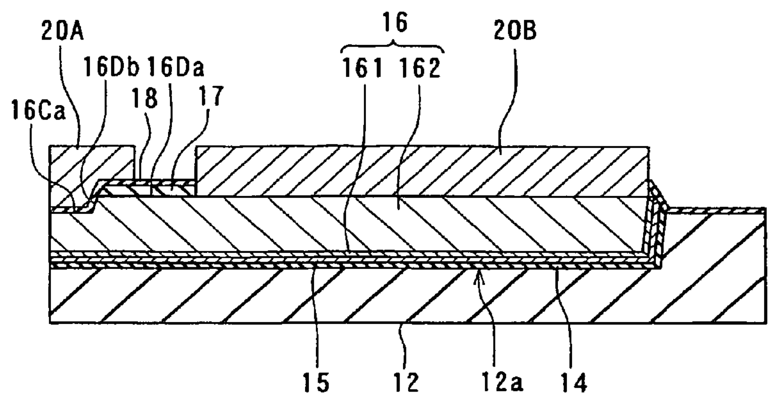
FIG. 24A and FIG. 24B are views for illustrating a step that follows the step shown in FIG. 23A and FIG. 23B.
Figure 24B:
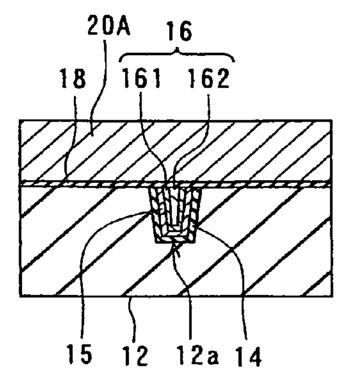

FIG. 24A and FIG. 24B illustrate the following step. In the step, first, portions of the gap layer 18 and the nonmagnetic film 17 that are away from the medium facing surface 30 are selectively etched to form openings in the gap layer 18 and the nonmagnetic film 17. Next, the first layer 20A is formed on the gap layer 18, and the yoke layer 20B is formed on a portion of the pole layer 16 where the openings of the gap layer 18 and the nonmagnetic film 17 are formed. The first layer 20A and the yoke layer 20B are formed by a method the same as that of the first embodiment.

Figure 25A:
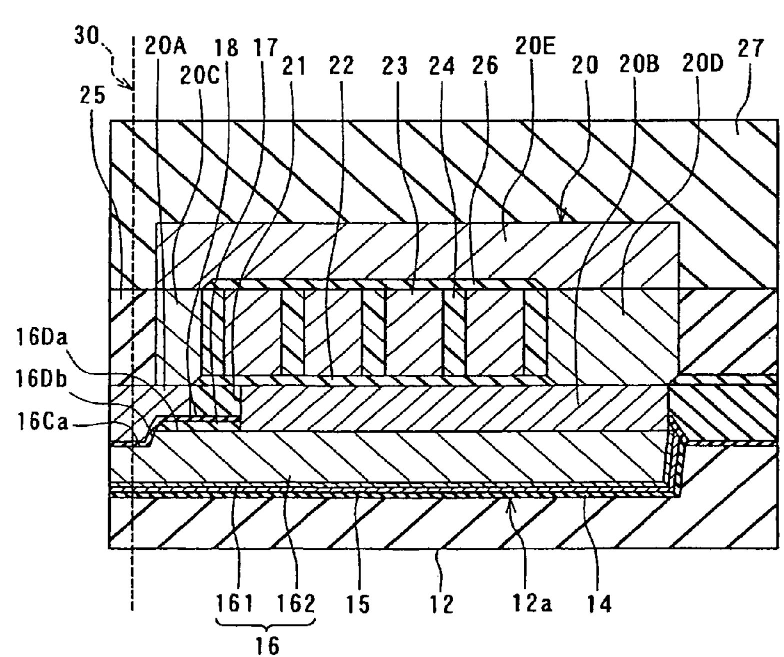
FIG. 25A and FIG. 25B are views for illustrating a step that follows the step shown in FIG. 24A and FIG. 24B.
Figure 25B:
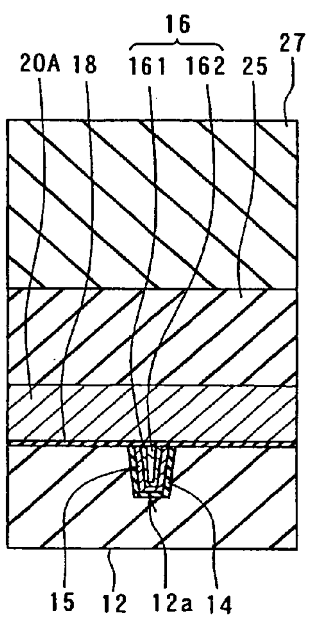

FIG. 25A and FIG. 25B illustrate the following step. In the step, first, the nonmagnetic layer 21 is formed on the entire top surface of the layered structure. Next, the nonmagnetic layer 21 is polished by CMP, for example, until the first layer 20A and the yoke layer 20B are exposed, and the top surfaces of the first layer 20A, the yoke layer 20B and the nonmagnetic layer 21 are thereby flattened. Next, the insulating layer 22 is formed on regions of the top surfaces of the yoke layer 20B and the nonmagnetic layer 21 in which the coil 23 will be disposed. Next, the coil 23 is formed by frame plating, for example, such that at least part of the coil 23 is disposed on the insulating layer 22. Next, the second layer 20C and the coupling layer 20D are formed by frame plating, for example. Alternatively, the coil 23 may be formed after the second layer 20C and the coupling layer 20D are formed. Next, the insulating layer 24 made of photoresist, for example, is selectively formed around the coil 23 and in the space between the respective adjacent turns of the coil 23. Next, the nonmagnetic layer 25 having a thickness of 4 to 4.5 μm, for example, is formed on the entire top surface of the layered structure. Next, the nonmagnetic layer 25 is polished by CMP, for example, so that the second layer 20C, the coupling layer 20D and the coil 23 are exposed, and the top surfaces of the second layer 20C, the coupling layer 20D, the coil 23, the insulating layer 24, and the nonmagnetic layer 25 are thereby flattened. Next, the insulating layer 26 is formed on the coil 23, the insulating layer 24 and the nonmagnetic layer 25. Next, the third layer 20E is formed by frame plating, for example, to complete the shield layer 20.

Next, the protection layer 27 is formed to cover the entire top surface of the layered structure. Wiring and terminals are then formed on the protection layer 27, the substrate is cut into sliders, and the steps including polishing of the medium facing surface 30 and fabrication of flying rails are performed. The magnetic head is thus completed.

According to the embodiment, the pole layer 16 incorporates the first portion 16C and the second portion 16D. The first portion 16C has the end face located in the medium facing surface 30, and has a thickness that does not change in accordance with the distance from the medium facing surface 30. The second portion 16D is located farther from the medium facing surface 30 than the first portion 16C and has a thickness greater than that of the first portion 16C. The surface 16Ca of the first portion 16C farther from the substrate 1 is located closer to the substrate 1 than the surface 16Da of the second portion 16D farther from the substrate 1. The second portion 16D has the front end face 16Db that couples the surface 16Ca of the first portion 16C farther from the substrate 1 to the surface 16Da of the second portion 16D farther from the substrate 1. The end face of the pole layer 16 located in the medium facing surface 30 has the first side A1 closest to the substrate 1 and the second side A2 opposite to the first side A1, and the second side A2 defines the track width. The surface 16Da of the second portion 16D farther from the substrate 1 is formed by polishing such as CMP. The surface 16Ca of the first portion 16C farther from the substrate 1 is formed by etching such as ion beam etching. Etching for forming the surface 16Ca is performed only on portions of the magnetic layers 161P and 162P near the medium facing surface 30 after the top surfaces of the magnetic layers 161P and 162P are flattened by CMP, for example. It is thereby possible to perform this etching with precision. Therefore, according to the embodiment, it is possible to control the thickness of the first portion 16C, that is, the thickness of the pole layer 16 taken in the medium facing surface 30, with precision. Furthermore, it is thereby possible to control the track width with precision.

According to the embodiment, in particular, etching of the portions of the magnetic layers 161P and 162P is performed such that the second side A2 of the end face of the pole layer 16 located in the medium facing surface 30 is disposed at a height that falls within the range between the height at which the top surface of the nonmagnetic metal layer 13 as initially formed is located and the height at which the bottom surface thereof is located. It is thereby possible to control the thickness of the pole layer 16 taken in the medium facing surface 30 and the track width with precision.

According to the embodiment, the second portion 16D of the pole layer 16 has a thickness greater than that of the first portion 16C. As a result, it is possible to introduce a magnetic flux of great magnitude to the medium facing surface 30 through the pole layer 16 while the thickness of the pole layer 16 taken in the medium facing surface 30 is reduced. It is thereby possible to implement a sufficient overwrite property.

Flux leakage from the pole layer 16 is likely to occur in the portion of the pole layer 16 where the thickness changes, that is, in a neighborhood of the front end face 16Db. If the flux leaking from this portion reaches the medium facing surface 30 and further leaks to the outside from the medium facing surface 30, the effective track width will increase and/or the problems resulting from the skew will occur. According to the embodiment, the shield layer 20 has the portion located between the front end face 16Db and the medium facing surface 30 in the region closer to the substrate 1 than the surface 16Da of the second portion 16D of the pole layer 16 farther from the substrate 1. Therefore, the leakage flux from the portion of the pole layer 16 in which the thickness changes is taken in by the shield layer 20. It is thereby possible that the flux leaking from somewhere in the middle of the pole layer 16 is prevented from leaking to the outside from the medium facing surface 30.

According to the embodiment, the magnetic head comprises the yoke layer 20B that touches the surface of the second portion 16D of the pole layer 16 farther from the substrate 1. An end of the yoke layer 20B closer to the medium facing surface 30 is located farther from the medium facing surface 30 than the location of the boundary between the surfaces 16Da and 16Db of the pole layer 16. Therefore, the magnetic layer made up of a combination of the pole layer 16 and the yoke layer 20B being considered, the thickness of this magnetic layer is reduced by two steps as the distance from the medium facing surface 30 decreases. As a result, it is possible to introduce a magnetic flux of great magnitude to the medium facing surface 30 while preventing saturation of flux halfway through the magnetic layer.

According to the embodiment, the top surface of the pole layer 16 bends in the neighborhood of the medium facing surface 30. It is thereby possible to suppress generation of residual magnetization in the direction orthogonal to the medium facing surface 30 in a portion of the pole layer 16 near the medium facing surface 30 after writing is performed. As a result, it is possible to suppress the occurrence of a phenomenon in which data stored on the recording medium is erased because of the residual magnetization in the pole layer 16 after writing is performed.

In the second embodiment, as in the first embodiment, the throat height TH is the distance between the medium facing surface 30 and the point at which the gap layer 18 first bends when seen from the medium facing surface 30, that is, the point at which the bottom surface of the first layer 20A first bends when seen from the medium facing surface 30. In the second embodiment the gap layer 18 and the nonmagnetic film 17 are disposed between the pole layer 16 and the first layer 20A in the region farther from the medium facing surface than the point at which the gap layer 18 first bends when seen from the medium facing surface 30. Consequently, flux leakage between the pole layer 16 and the shield layer 20 in this region is less, compared with the case in which the nonmagnetic film 17 is not provided. As a result, according to the embodiment, it is possible to introduce a magnetic flux of great magnitude to the medium facing surface 30 and it is thereby possible to improve the overwrite property. The remainder of configuration, function and effects of the second embodiment are similar to those of the first embodiment.

Modification Examples

Figures 26A, 26B:
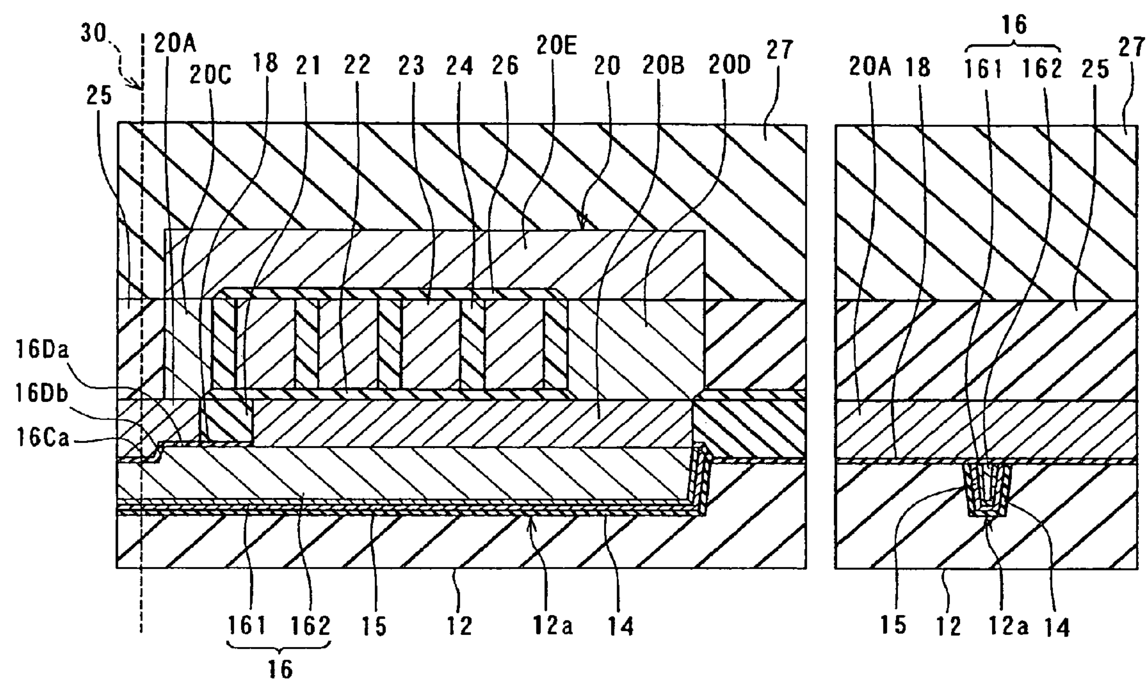
FIG. 26A and FIG. 26B are views for illustrating a first modification example of the magnetic head of the second embodiment of the invention.

First and second modification examples of the second embodiment will now be described. FIG. 26A and FIG. 26B illustrate the first modification example. FIG. 26A shows a cross section of the main part of the magnetic head orthogonal to the medium facing surface and the substrate. FIG. 26B shows a cross section of the main part of the magnetic head near the medium facing surface that is parallel to the medium facing surface. In FIG. 26A and FIG. 26B the portions closer to the substrate 1 than the encasing layer 12 are omitted.

In the first modification example the nonmagnetic film 17 is not provided while the gap layer 18 is disposed on the surface 16Da of the second portion 16D of the pole layer 16. The remainder of configuration, function and effects of the first modification example are similar to those of the magnetic head illustrated in FIG. 17 to FIG. 19 except the function and effects resulting from the nonmagnetic film 17.

Figure 27A:
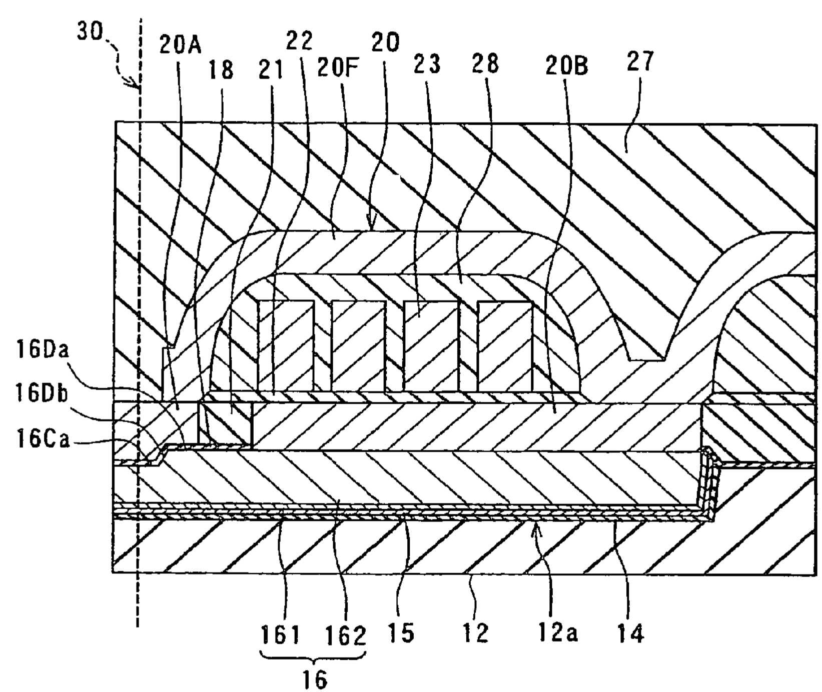
FIG. 27A and FIG. 27B are views for illustrating a second modification example of the magnetic head of the second embodiment of the invention.
Figure 27B:
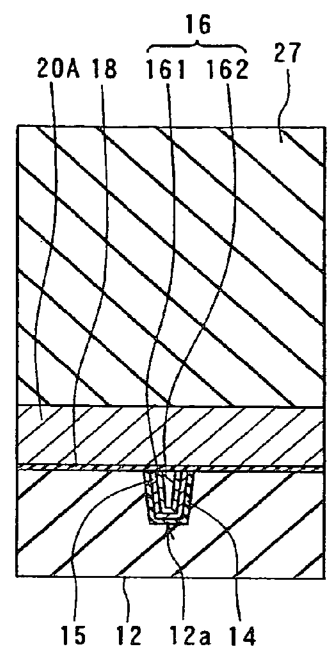

FIG. 27A and FIG. 27B illustrate the second modification example. FIG. 27A shows a cross section of the main part of the magnetic head orthogonal to the medium facing surface and the substrate. FIG. 27B shows a cross section of the main part of the magnetic head near the medium facing surface that is parallel to the medium facing surface. In FIG. 27A and FIG. 27B the portions closer to the substrate 1 than the encasing layer 12 are omitted.

In the second modification example, as in the first modification example, the nonmagnetic film 17 is not provided while the gap layer 18 is disposed on the surface 16Da of the second portion 16D of the pole layer 16. The magnetic head of the second modification example comprises the insulating layer 28 that covers at least part of the coil 23 in place of the insulating layer 24 of FIG. 18. The insulating layer 28 is made of photoresist, for example. The shield layer 20 of the second modification example comprises the second layer 20F in place of the second layer 20C, the coupling layer 20D and the third layer 20E of the FIG. 18. One of end faces of the second layer 20F closer to the medium facing surface 30 is located at a distance from the medium facing surface 30. The second layer 20F is disposed to couple the first layer 20A to the yoke layer 20B. The second layer 20F includes a portion located on a side of the at least part of the coil 23 covered with the insulating layer 28, the side being opposite to the pole layer 16. The second layer 20F may be made of any of CoFeN, CoNiFe, NiFe, and CoFe, for example. In the second modification example, the protection layer 27 is disposed between the medium facing surface 30 and the end face of the second layer 20F closer to the medium facing surface 30. The protection layer 27 of the second modification example corresponds to the second nonmagnetic layer of the invention. It is preferred that the protection layer 27 have a thermal expansion coefficient smaller than that of the insulating layer 28. The remainder of configuration, function and effects of the magnetic head of the second modification example are similar to those of the first modification example.

It is possible to provide modification examples of the second embodiment that are similar to the first to third modification examples of the first embodiment.

Third Embodiment

Figure 28:
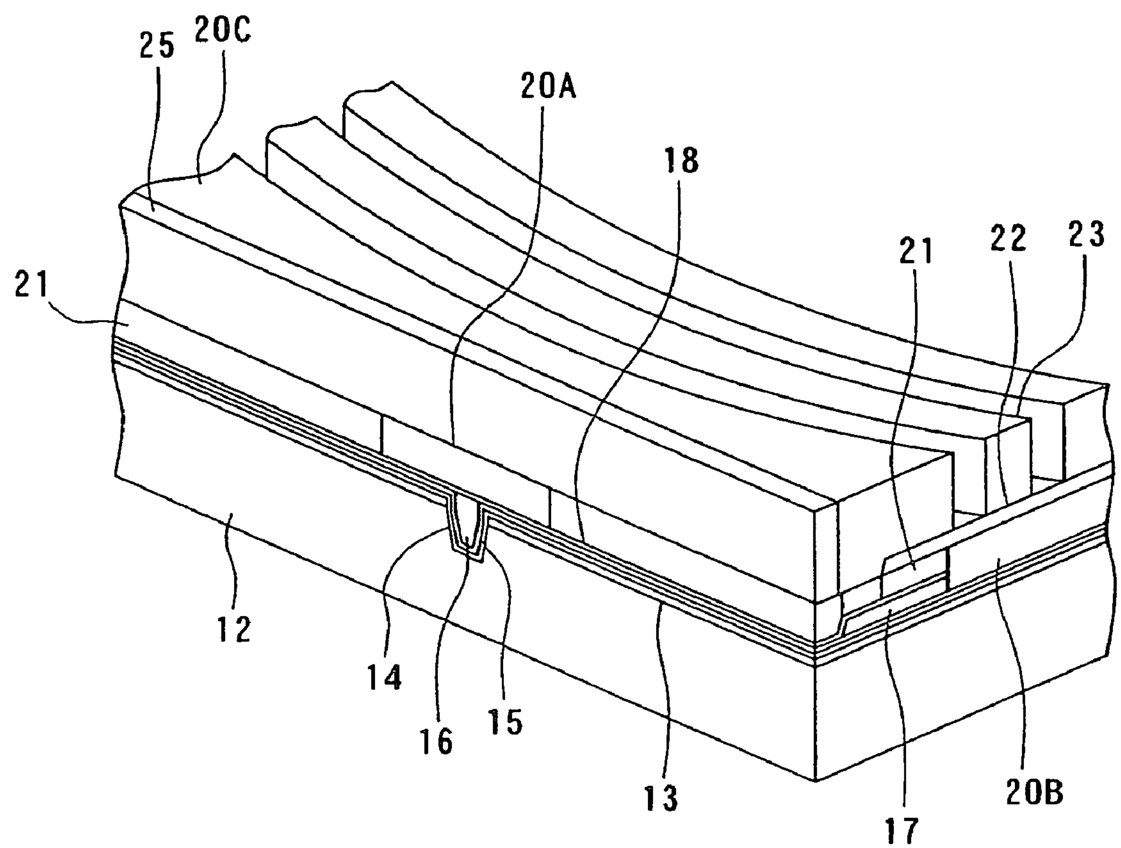
FIG. 28 is a perspective view illustrating a portion of a magnetic head of a third embodiment of the invention in a neighborhood of the medium facing surface.
Figure 29:
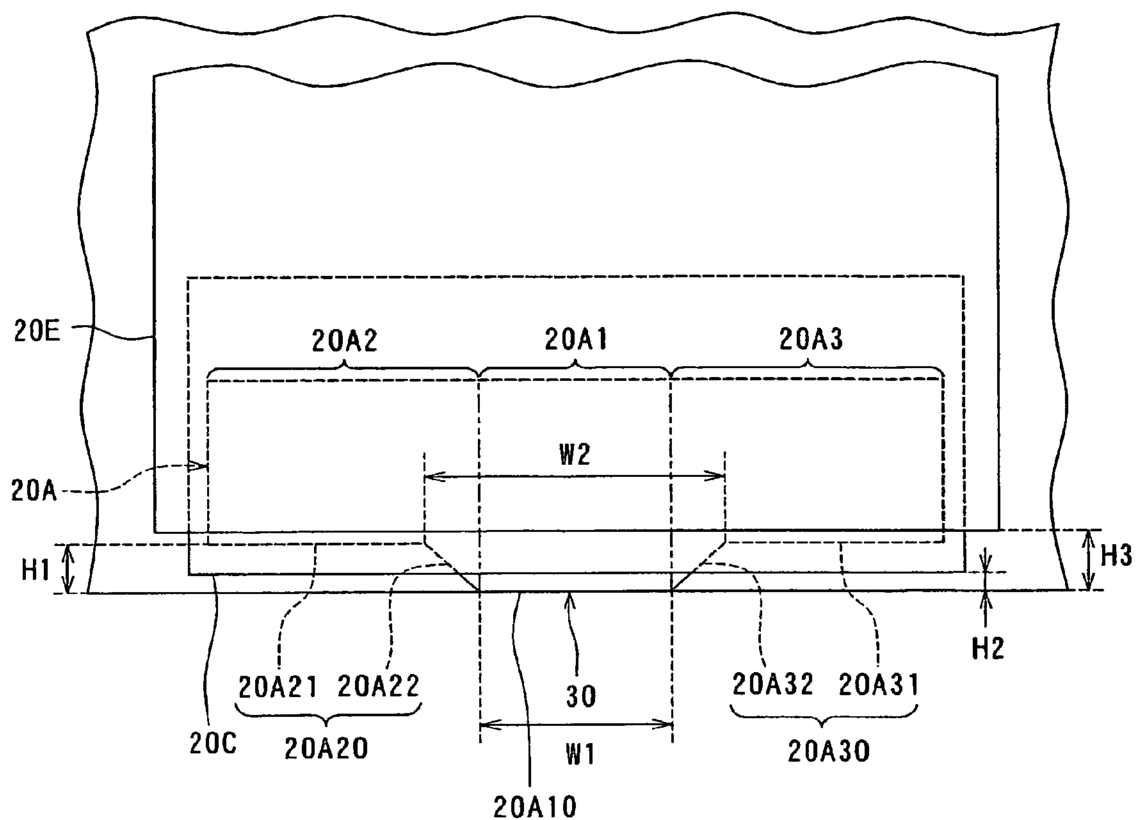
FIG. 29 is a top view illustrating a portion of the shield layer of the magnetic head of the third embodiment of the invention.

Reference is now made to FIG. 28 and FIG. 29 to describe a magnetic head and a method of manufacturing the same of a third embodiment of the invention. FIG. 28 is a perspective view illustrating a portion of the magnetic head of the third embodiment in a neighborhood of the medium facing surface. FIG. 29 is a top view illustrating a portion of the shield layer of the magnetic head of the third embodiment.

In the third embodiment, as shown in FIG. 29, the first layer 20A of the shield layer 20 incorporates two side portions 20A2 and 20A3 located at positions along the direction of width outside the end face located in the medium facing surface 30 when seen from the medium facing surface 30. A portion of the first layer 20A located between the two side portions 20A2 and 20A3 is called a middle portion 20A1. The middle portion 20A1 has the end face 20A10 located in the medium facing surface 30. Respective end faces 20A20 and 20A30 of the side portions 20A2 and 20A3 each of which is closer to the medium facing surface 30 are located at a distance from the medium facing surface 30. As shown in FIG. 28, the nonmagnetic layer 21 disposed around the first layer 20A is located between the medium facing surface 30 and the end faces 20A20 and 20A30.

The distance between the medium facing surface 30 and the end faces 20A20 and 20A30 of the side portions 20A2 and 20A3 gradually increases from the boundary between the middle portion 20A1 and the side portions 20A2 and 20A3 toward the outside along the direction of width, and then maintains a specific distance. That is, the end faces 20A20 and 20A30 respectively incorporate parallel portions 20A21 and 20A31 that are parallel to the medium facing surface 30, and sloped portions 20A22 and 20A32 that connect the parallel portions 20A21 and 20A31 to the end face 20A10 of the middle portion 20A1.

The width W1 of the end face of the first layer 20A located in the medium facing surface 30, that is, the end face 20A10 of the middle portion 20A1, is equal to or greater than the track width. The width W1 preferably falls within a range of 0.1 to 10 μm inclusive. The distance W2 from the boundary between the parallel portion 20A21 and the sloped portion 20A22 to the boundary between the parallel portion 20A31 and the sloped portion 20A32 preferably falls within a range of 1.0 to 11 μm inclusive.

The distance H1 between the medium facing surface 30 and the parallel portions 20A21 and 20A31 preferably falls within a range of 0.2 to 0.8 μm inclusive. The distance H2 between the medium facing surface 30 and the end face of the second layer 20C closer to the medium facing surface 30 preferably falls within a range of 0.2 to 0.8 μm inclusive. The distance H3 between the medium facing surface 30 and the end face of the third layer 20E closer to the medium facing surface 30 preferably falls within a range of 0.2 to 0.8 μm inclusive.

It is acceptable that the end faces 20A20 and 20A30 of the side portions 20A2 and 20A3 do not incorporate the sloped portions 20A22 and 20A32. In this case, the middle portion 20A1 has two side faces that connect the end face 20A10 to the parallel portions 20A21 and 20A31. These two side faces are orthogonal to the medium facing surface 30.

In the third embodiment, the first layer 20A of the shield layer 20 incorporates the two side portions 20A2 and 20A3 located at positions along the direction of width outside the end face located in the medium facing surface 30 when seen from the medium facing surface 30. As a result, according to the embodiment, it is possible to make the area of the end face of the shield layer 20 exposed in the medium facing surface 30 smaller, compared with the first embodiment. It is thereby possible to define the throat height TH with higher accuracy and to suppress protrusion of the end portion of the shield layer 20 located closer to the medium facing surface 30 resulting from the heat generated by the coil 23.

In the third embodiment, the end face of each of the second layer 20C and the third layer 20E that is closer to the medium facing surface 30 may be located in the medium facing surface 30. In this case, too, as compared with the magnetic head of FIG. 32, it is possible to make the area of the end face of the shield layer 20 exposed in the medium facing surface 30 smaller, so that it is possible to define the throat height TH with accuracy and to suppress protrusion of the end portion of the shield layer 20 located closer to the medium facing surface 30 resulting from the heat generated by the coil 23. However, to make the most of these effects, it is preferred that the end face of each of the second layer 20C and the third layer 20E closer to the medium facing surface 30 be located at a distance from the medium facing surface 30.

For conventional shield-type heads, there are some cases in which such a phenomenon arises that there occurs attenuation of signals written on one or more tracks adjacent to the track that is a target of writing or reading in a wide range along the direction of track width. (The phenomenon will be hereinafter called wide-range adjacent track erase.) It is assumed that the wide-range adjacent track erase results from a magnetic flux passing through the end face of the shield layer exposed in the medium facing surface.

In the third embodiment only the end face 20A10 of the middle portion 20A1 of the first layer 20A of the shield layer 20 is located in the medium facing surface 30. In addition, the end faces 20A20 and 20A30 of the side portions 20A2 and 20A3 are located at a distance from the medium facing surface 30. As a result, according to the embodiment, it is possible to make the width of the end face of the first layer 20A exposed in the medium facing surface 30 smaller, compared with the case in which the entire end face of the first layer 20A closer to the medium facing surface 30 is exposed in the medium facing surface 30. Furthermore, according to the embodiment, it is possible to adjust the amount of magnetic flux passing through the end face of the shield layer 20 exposed in the medium facing surface 30 by controlling the shape of the first layer 20A. These features of the embodiment make it possible to suppress the wide-range adjacent track erase.

The remainder of configuration, function and effects of the third embodiment are similar to those of the first embodiment including the modification examples.

Fourth Embodiment

Figure 30:
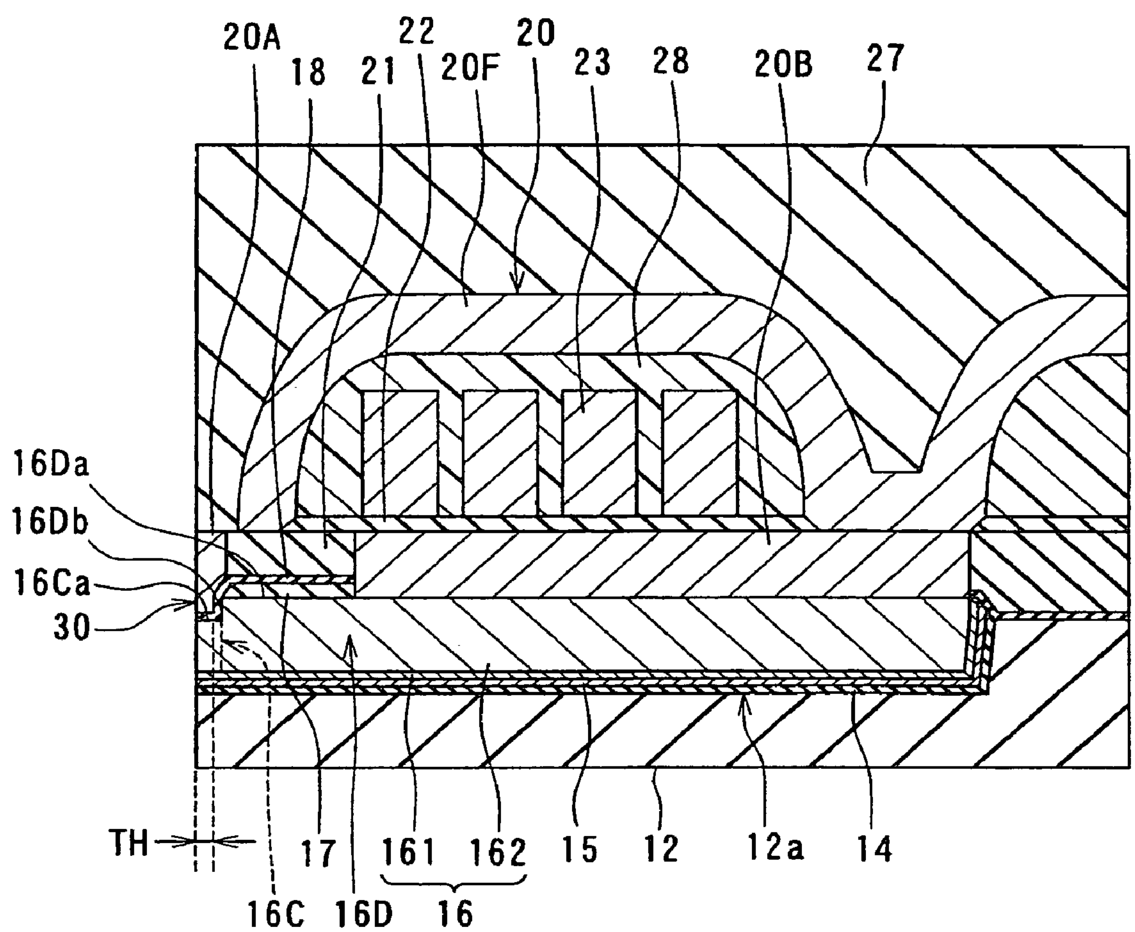
FIG. 30 is a cross-sectional view illustrating a portion of a magnetic head of a fourth embodiment of the invention.
Figure 31:
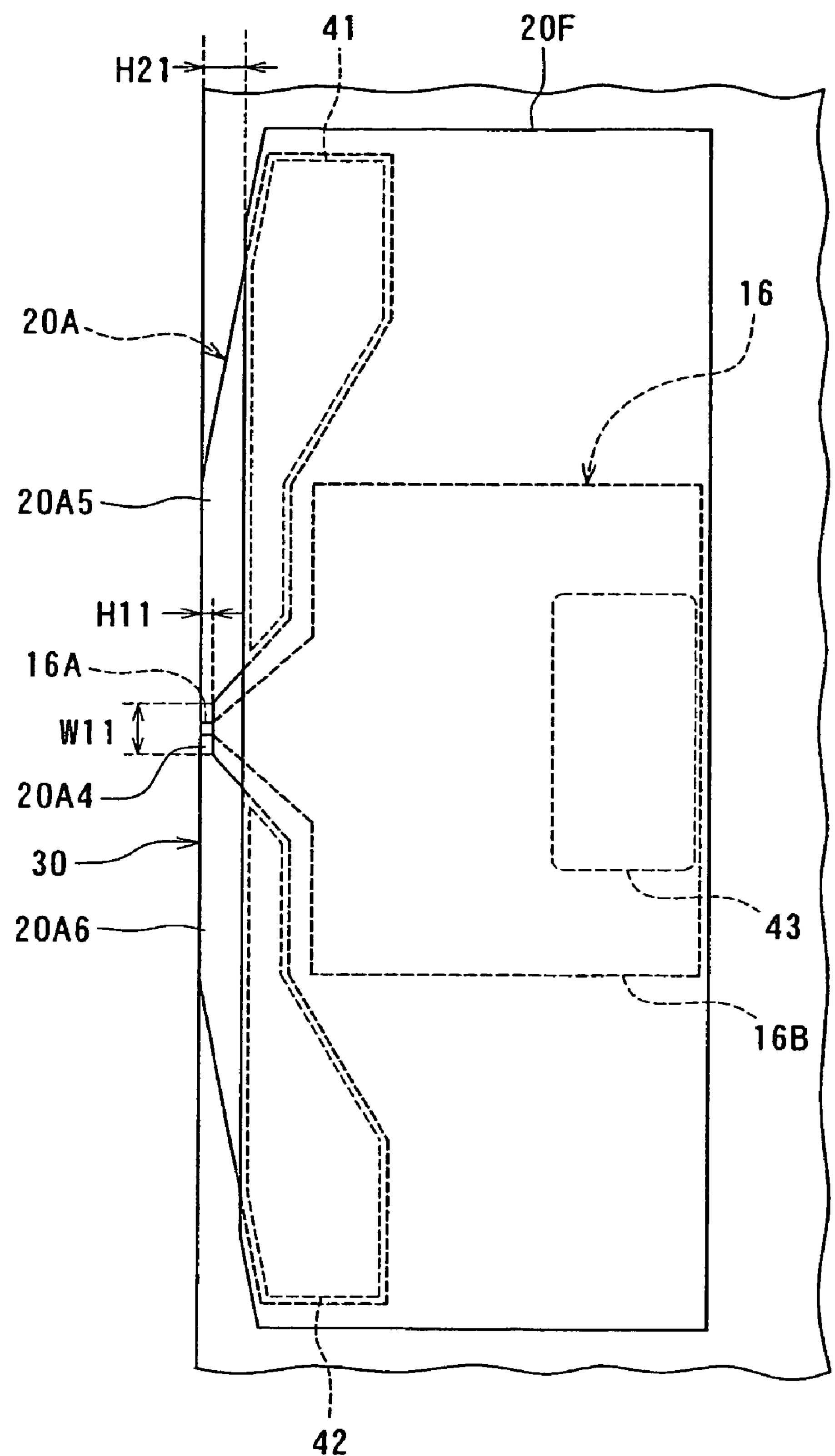
FIG. 31 is a top view illustrating the shield layer of the magnetic head of the fourth embodiment of the invention.

Reference is now made to FIG. 30 and FIG. 31 to describe a magnetic head and a method of manufacturing the same of a fourth embodiment of the invention. FIG. 30 is a cross-sectional view illustrating a portion of the magnetic head of the embodiment. FIG. 30 illustrates a cross section orthogonal to the medium facing surface and the substrate. In FIG. 30 the portions closer to the substrate than the encasing layer are omitted. FIG. 31 is a top view of the shield layer of the magnetic head of the embodiment.

In the fourth embodiment, as in the second embodiment, as shown in FIG. 30, the pole layer 16 incorporates: a first portion 16C having the end face located in the medium facing surface 30; and a second portion 16D located farther from the medium facing surface 30 than the first portion 16C and having a thickness greater than that of the first portion 16C. The thickness of the first portion 16C does not change in accordance with the distance from the medium facing surface 30.

The surface (the top surface) 16Ca of the first portion 16C farther from the substrate 1 is located closer to the substrate 1 than the surface (the top surface) 16Da of the second portion 16D farther from the substrate 1. The second portion 16D has the front end face 16Db that couples the surface 16Ca of the first portion 16C farther from the substrate 1 to the surface 16Da of the second portion 16D farther from the substrate 1.

An end of the nonmagnetic film 17 closer to the medium facing surface 30 is located at a position corresponding to a corner portion formed between the surfaces 16Da and 16Db.

The magnetic head of the fourth embodiment comprises the insulating layer 28 that covers at least part of the coil 23 in place of the insulating layer 24 of FIG. 18. The insulating layer 28 is made of photoresist, for example. The shield layer 20 comprises the second layer 20F in place of the second layer 20C, the coupling layer 20D and the third layer 20E of the FIG. 18. One of end faces of the second layer 20F closer to the medium facing surface 30 is located at a distance from the medium facing surface 30. The second layer 20F includes a portion located on a side of the at least part of the coil 23 covered with the insulating layer 28, the side being opposite to the pole layer 16. The second layer 20F may be made of any of CoFeN, CoNiFe, NiFe, and CoFe, for example. The protection layer 27 is disposed between the medium facing surface 30 and the end face of the second layer 20F closer to the medium facing surface 30. The protection layer 27 of the fourth embodiment corresponds to the second nonmagnetic layer of the invention. It is preferred that the protection layer 27 have a thermal expansion coefficient smaller than that of the insulating layer 28.

The shield layer 20 has a portion that is sandwiched between the front end face 16Db and the medium facing surface 30 and that is located in a region closer to the substrate 1 than the surface 16Da of the second portion 16D farther from the substrate 1. To be specific, this portion is a portion of the first layer 20A of the shield layer 20 closer to the substrate 1 than the surface 16Da. An end of the yoke layer 20B of the shield layer 20 located closer to the medium facing surface 30 is located farther from the medium facing surface 30 than the boundary between the surfaces 16Da and 16Db of the pole layer 16.

In the fourth embodiment, as shown in FIG. 31, the first layer 20A incorporates: a middle portion 20A4 including a portion that faces toward the pole layer 16 with the gap layer 18 disposed in between; and two side portions 20A5 and 20A6 disposed outside the middle portion 20A4 along the direction of width.

The middle portion 20A4 has an end face located in the medium facing surface 30. The side portions 20A5 and 20A6 have respective end faces each of which is located closer to the medium facing surface 30. Of these end faces, portions contiguous to the end face of the middle portion 20A4 are located in the medium facing surface 30, and the remaining portion is located at a distance from the medium facing surface 30.

The maximum length of the side portions 20A5 and 20A6 taken in the direction orthogonal to the medium facing surface 30 is greater than the maximum length of the middle portion 20A4 taken in the direction orthogonal to the medium facing surface 30. In the example shown in FIG. 31, the length of the middle portion 20A4 taken in the direction orthogonal to the medium facing surface 30 is uniform. The length H11 of the middle portion 20A4 falls within a range of 0.1 to 0.3 μm, for example. The width W11 of the middle portion 20A4 falls within a range of 0.3 to 5.0 μm, for example.

The middle portion 20A4 may have a portion located above the nonmagnetic film 17. Alternatively, it is acceptable that the middle portion 20A4 does not have any portion located above the nonmagnetic film 17. If the middle portion 20A4 has the portion located above the nonmagnetic film 17, the throat height TH is the distance from the medium facing surface 30 to the point at which the gap layer 18 first bends when seen from the medium facing surface 30. If the middle portion 20A4 has no portion located above the nonmagnetic film 17, the throat height TH is the smaller one of the length H11 of the middle portion 20A4 and the distance from the medium facing surface 30 to the point at which the gap layer 18 first bends when seen from the medium facing surface 30.

An end face of the second layer 20F closer to the medium facing surface 30 is located at a distance from the medium facing surface 30. The distance H21 between the medium facing surface 30 and the end face of the second layer 20F closer to the medium facing surface 30 falls within a range of 0.3 to 0.9 μm, for example.

The second layer 20F is not connected to the middle portion 20A4 of the first layer 20A, but connected to the side portions 20A5 and 20A6 of the first layer 20A. In FIG. 31 numerals 41 and 42 indicate through holes for connecting the second layer 20F to the side portions 20A5 and 20A6. The second layer 20F is connected to the pole layer 16 at a point away from the medium facing surface 30. In FIG. 31 numeral 43 indicates a through hole for connecting the second layer 20F to the pole layer 16.

If the magnetic head has such a configuration that the second layer 20F is connected to the portion of the first layer 20A that faces toward the pole layer 16 with the gap layer 18 in between, it is required to increase the length of the above-mentioned portion of the first layer 20A taken in the direction orthogonal to the medium facing surface 30 to some extent. However, this will cause a possibility that it is impossible to obtain a sufficient overwrite property. In addition, if the length of the above-mentioned portion of the first layer 20A taken in the direction orthogonal to the medium facing surface 30 is great, there also occurs an increase in the distance from the medium facing surface 30 to the junction between the second layer 20F and the pole layer 16 (the distance may be hereinafter called the yoke length). An increase in yoke length results in a possibility of degradation in write characteristics in a high frequency range. To prevent this, it is possible to reduce the yoke length by reducing the pitch of the turns of the coil 23. In this case, however, the resistance of the coil 23 will be increased.

In the fourth embodiment, as mentioned above, the second layer 20F is not connected to the middle portion 20A4 of the first layer 20A, but connected to the side portions 20A5 and 20A6 of the first layer 20A. As a result, according to the embodiment, it is possible to connect the first layer 20A to the second layer 20F with accuracy while reducing the length H11 of the middle portion 20A4. It is thereby possible to improve the overwrite property and to prevent an increase in yoke length and an increase in resistance of the coil 23.

In the fourth embodiment the shield layer 20 may incorporate the second layer 20C, the coupling layer 20D and the third layer 20E of FIG. 18 in place of the second layer 20F. In this case, the second layer 20C is not connected to the middle portion 20A4 of the first layer 20A but connected to the side portions 20A5 and 20A6 of the first later 20A.

In the fourth embodiment the pole layer 16 may have a shape the same as that of the first embodiment. In the fourth embodiment, as in the second modification example of the second embodiment, it is not absolutely necessary to provide the nonmagnetic film 17. The remainder of configuration, function and effects of the fourth embodiment are similar to those of the second embodiment.

The present invention is not limited to the foregoing embodiments but may be practiced in still other ways. For example, the shield layer 20 of the second embodiment may have a configuration the same as that of the third embodiment.

A coil wound around the pole layer 16 in a helical manner may be provided in any of the embodiments in place of the flat-whorl-shaped coils 9 and 23.

In the foregoing embodiments, at least a portion of the pole layer 16 is formed in the groove 12*a* of the encasing layer 12. However, the pole layer of the invention is not limited to the one formed in such a manner but may be formed otherwise. For example, the pole layer may be formed by patterning a magnetic layer by etching, or may be formed by plating.

While the magnetic head disclosed in the embodiment has such a configuration that the read head is formed on the base body and the write head is stacked on the read head, it is also possible that the read head is stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:

a medium facing surface that faces toward a recording medium;

a coil for generating a magnetic field corresponding to data to be written on the recording medium;

a pole layer having an end face located in the medium facing surface, allowing a magnetic flux corresponding to the field generated by the coil to pass therethrough, and generating a write magnetic field for writing the data on the recording medium by means of a perpendicular magnetic recording system;

a shield layer having an end face located in the medium facing surface and having a portion that is away from the medium facing surface and coupled to the pole layer; and a gap layer made of a nonmagnetic material and disposed between the pole layer and the shield layer, wherein:

in the medium facing surface, the end face of the shield layer is located forward of the end face of the pole layer along a direction of travel of the recording medium with a specific space created by a thickness of the gap layer;

at least part of the coil is disposed between the pole layer and the shield layer and insulated from the pole layer and the shield layer;

the end face of the pole layer located in the medium facing surface has a side located adjacent to the gap layer, the side defining a track width; and the shield layer incorporates: a first layer located adjacent to the gap layer and having the end face located in the medium facing surface; and a second layer located on a side of the first layer farther from the gap layer; and the first layer has two portions located at positions along a direction of width outside the end face located in the medium facing surface when seen from the medium facing surface, and an end face of each of the two portions closer to the medium facing surface is located at a distance from the medium facing surface, the magnetic head further comprising: an insulating layer made of an insulating material and disposed around the at least part of the coil; and a nonmagnetic layer made of a nonmagnetic material and disposed around the first layer.

2. The magnetic head according to claim 1, wherein the nonmagnetic layer is made of an inorganic insulating material.

3. The magnetic head according to claim 1, wherein the at least part of the coil is located farther from the pole layer than a surface of the first layer farther from the pole layer.

4. The magnetic head according to claim 1, further comprising a nonmagnetic film made of a nonmagnetic material and disposed between the pole layer and the second layer, wherein:

the nonmagnetic film has an end closer to the medium facing surface that is located at a distance from the medium facing surface; and the first layer has a portion located between the nonmagnetic film and the second layer.

* * * * *